US012253844B2

(12) United States Patent
Otsuka et al.

(10) Patent No.: US 12,253,844 B2
(45) Date of Patent: Mar. 18, 2025

(54) DATA PROCESSING DEVICE, DATA PROCESSING METHOD, AND ROBOT

(71) Applicant: SONY GROUP CORPORATION, Tokyo (JP)

(72) Inventors: Masahiro Otsuka, Kanagawa (JP); Norifumi Goto, Tokyo (JP); Kenichi Seta, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 87 days.

(21) Appl. No.: 17/635,565

(22) PCT Filed: Sep. 23, 2020

(86) PCT No.: PCT/JP2020/035752
§ 371 (c)(1),
(2) Date: Feb. 15, 2022

(87) PCT Pub. No.: WO2021/065608
PCT Pub. Date: Apr. 8, 2021

(65) Prior Publication Data
US 2022/0269246 A1 Aug. 25, 2022

(30) Foreign Application Priority Data
Oct. 3, 2019 (JP) ................. 2019-183083

(51) Int. Cl.
G05B 19/4155 (2006.01)
B25J 9/16 (2006.01)
G06F 9/445 (2018.01)

(52) U.S. Cl.
CPC ........ *G05B 19/4155* (2013.01); *B25J 9/1656* (2013.01); *G06F 9/445* (2013.01); *G05B 2219/40572* (2013.01)

(58) Field of Classification Search
CPC ....... G05B 19/4155; G05B 2219/40572; B25J 9/1656; G06F 9/445
See application file for complete search history.

(56) References Cited

U.S. PATENT DOCUMENTS 8,965,104 B1  2/2015 Hickman et al.
2006/0276934 A1* 12/2006 Nihei .................... B25J 9/1679
                                                    700/245
(Continued)

FOREIGN PATENT DOCUMENTS

CN   101927494 A   12/2010
CN   102804211 A   11/2012
(Continued)

Primary Examiner — Basil T. Jos
Assistant Examiner — Jay Khandpur
(74) Attorney, Agent, or Firm — Paratus Law Group, PLLC

(57) ABSTRACT

There is provided a data processing device, a data processing method, and a robot capable of performing environment sensing using an appropriate algorithm. The data processing device according to one aspect of the present technology is provided with a sensing control unit configured to adaptively select and execute an environment sensing program in which an environment sensing algorithm to sense an environment on the basis of sensor data output from a sensor mounted on a robot is defined according to an environment sensing condition. The present technology may be applied to a sensor device mounted on various devices.

19 Claims, 32 Drawing Sheets

(56) References Cited

U.S. PATENT DOCUMENTS

| | | | |
|---|---|---|---|
| 2011/0066284 A1 | 3/2011 | Curtis | |
| 2012/0232697 A1 | 9/2012 | Lee et al. | |
| 2012/0240710 A1* | 9/2012 | Yokoyama | H01L 21/67766 74/490.05 |
| 2013/0013776 A1 | 1/2013 | Tajima | |
| 2015/0090865 A1 | 4/2015 | Calatayud | |
| 2015/0331416 A1* | 11/2015 | Feniello | B25J 9/1661 700/250 |
| 2017/0225331 A1* | 8/2017 | Sussman | B25J 9/1676 |
| 2017/0312916 A1 | 11/2017 | Williams | |
| 2018/0207812 A1* | 7/2018 | Yoon | B25J 9/0027 |
| 2018/0314362 A1* | 11/2018 | Kim | G06F 1/1637 |
| 2018/0348023 A1 | 12/2018 | Klein et al. | |
| 2019/0064817 A1* | 2/2019 | Schmitt | A01D 41/127 |
| 2020/0200393 A1* | 6/2020 | Goldberg | F24C 7/088 |
| 2022/0331957 A1* | 10/2022 | Goto | B25J 9/1664 |

FOREIGN PATENT DOCUMENTS

| | | |
|---|---|---|
| CN | 106358154 A | 1/2017 |
| CN | 107532906 A | 1/2018 |
| CN | 107636548 A | 1/2018 |
| CN | 110140094 A | 8/2019 |
| CN | 110281248 A | 9/2019 |
| JP | 2002-504724 A | 2/2002 |
| JP | 2004301796 A | 10/2004 |
| JP | 2007-286850 A | 11/2007 |
| JP | 2008-068342 A | 3/2008 |
| JP | 2011-198021 A | 10/2011 |
| JP | 2019029986 A | 2/2019 |
| KR | 20070045467 A | 5/2007 |
| KR | 101803195 B1 | 11/2017 |
| KR | 20190106910 A | 9/2019 |
| WO | WO 2018/112495 A2 | 6/2018 |

* cited by examiner

FIG. 20

| SENSING ALGORITHM | | DESCRIPTION OF SENSING ALGORITHM |
|---|---|---|
| A1 | A1-1 | FOR NARROW PLACE: ALGORITHM USABLE ONLY IN NARROW PLACE BUT WITH HIGH ACCURACY (POOR RESPONSIVENESS) |
| | A1-2 | FOR WIDE PLACE: ALGORITHM USABLE ALSO IN WIDE PLACE BUT WITH LOW ACCURACY (POOR RESPONSIVENESS) |
| A2 | | ALGORITHM USABLE IN WIDE PLACE AND WITH SUFFICIENT RESPONSIVENESS FOR CAPTURING MOVING OBJECT |
| A3 | | ALGORITHM RESISTANT TO RAIN |
| A4 | | ALGORITHM RESISTANT TO DIRECT SUNLIGHT |
| A5 | | ALGORITHM ADAPTABLE TO DARKISH PLACE |
| A6 | | ALGORITHM RESISTANT TO SHADOW |
| A7 | | ALGORITHM RESISTANT TO RANGING OF REFLECTOR |
| A8 | | ALGORITHM CAPABLE OF DETECTING TRANSPARENT OBJECT |
| A9 | | ALGORITHM CAPABLE OF COPING WITH COMPLETELY DARK PLACE |

FIG. 25

| SERVING SITUATION | USABLE SENSING ALGORITHM | USE CASE | TRANSITION |
|---|---|---|---|
| CARRY OUT OF KITCHEN | A1-1, A1-2, A2, A4, A7, A8, A9 | MOVE TO PARTY ROOM | A1-1 → A2 |
| | | MOVE TO GARDEN | A1-1 → A4 |
| | | MOVE TO PARTY ROOM THROUGH GLASS-WALLED CORRIDOR | A1-1 → A8 → A2 |
| | | MOVE TO PARTY ROOM THROUGH CORRIDOR WITH MIRROR | A1-1 → A7 → A2 |
| | | MOVE TO DINING ROOM THROUGH DARK CORRIDOR WITHOUT LIGHTING | A1-1 → A9 → A2 |
| SERVE IN GARDEN | A3, A4, A5, A6 | COMPLETE SERVING EVEN WHEN IT RAINS | A4 → A3 |
| | | COMPLETE SERVING EVEN WHEN IT GETS DARK | A4 → A5 |
| | | COMPLETE SERVING EVEN WHEN SHADOW RANGE CHANGES BECAUSE SUN GOES BEHIND CLOUD | A4 → A6 |

DATA PROCESSING DEVICE, DATA PROCESSING METHOD, AND ROBOT

CROSS REFERENCE TO PRIOR APPLICATION

This application is a National Stage Patent Application of PCT International Patent Application No. PCT/JP2020/035752 (filed on Sep. 23, 2020) under 35 U.S.C. § 371, which claims priority to Japanese Patent Application No. 2019-183083 (filed on Oct. 3, 2019), which are all hereby incorporated by reference in their entirety.

TECHNICAL FIELD

The present technology especially relates to a data processing device, a data processing method, and a robot capable of performing environment sensing using an appropriate algorithm.

BACKGROUND ART

Conventionally, various technologies for updating software of a device have been suggested from the viewpoint of adding a function and securing compatibility with other devices.

For example, Patent Document 1 discloses a technology of determining a service that may be implemented by a combination of a camera and a communication device, and installing software that provides the service.

Furthermore, Patent Document 2 discloses a technology of updating firmware between an imaging device and a host system in a case where it is detected that the firmware of the imaging device is incompatible with the host system.

CITATION LIST

Patent Document

Patent Document 1: Japanese Patent Application Laid-Open No. 2007-286850
Patent Document 2: Japanese Unexamined Patent Publication No. 2002-504724

SUMMARY OF THE INVENTION

Problems to be Solved by the Invention

Although various technologies for changing software of an imaging device such as a camera are disclosed, it is not disclosed to adaptively change software of a device that performs sensing according to a situation of a sensing target and the like.

The present technology is achieved in view of such a situation, and an object thereof is to perform environment sensing using an appropriate algorithm.

Solutions to Problems

A data processing device according to a first aspect of the present technology is provided with a sensing control unit configured to adaptively select and execute an environment sensing program in which an environment sensing algorithm to sense an environment on the basis of sensor data output from a sensor mounted on a robot is defined according to an environment sensing condition.

A data processing device according to a second aspect of the present technology is provided with a data processing unit configured to adaptively select an environment sensing program in which an environment sensing algorithm to sense an environment on the basis of sensor data output from a sensor mounted on a robot is defined according to an environment sensing condition, and transmit to the robot.

A robot according to a third aspect of the present technology is provided with a sensor configured to output sensor data indicating a sensing result, a sensing control unit configured to adaptively select and execute an environment sensing program in which an environment sensing algorithm to sense an environment on the basis of the sensor data output from the sensor is defined according to an environment sensing condition, an operation plan setting unit configured to set an operation plan on the basis of an execution result of the environment sensing program by the sensing control unit, and an operation unit configured to perform an operation according to the operation plan set by the operation plan setting unit.

In the first aspect of the present technology, the environment sensing program in which the environment sensing algorithm to sense the environment on the basis of the sensor data output from the sensor mounted on the robot is defined is adaptively selected and executed according to the environment sensing condition.

In the second aspect of the present technology, the environment sensing program in which the environment sensing algorithm to sense the environment on the basis of the sensor data output from the sensor mounted on the robot is defined is adaptively selected according to the environment sensing condition and transmitted to the robot.

In the third aspect of the present technology, the environment sensing program in which the environment sensing algorithm to sense the environment on the basis of the sensor data output from the sensor that outputs the sensor data indicating the sensing result is defined is adaptively selected and executed according to the environment sensing condition, the operation plan is set on the basis of the execution result of the environment sensing program, and the operation is performed according to the set operation plan.

BRIEF DESCRIPTION OF DRAWINGS

FIG. 20 is a view illustrating an example of a sensing algorithm.

FIG. 25 is a view illustrating an example of correspondence between a serving situation and the sensing algorithm.

MODE FOR CARRYING OUT THE INVENTION

<Outline of Present Technology>

The present technology focuses on a point that it is difficult to perform sensing using an optimal algorithm in a sensor device mounted on various devices such as a robot, a moving body, and a smartphone due to the following factors, and achieves a solution thereof.

Factors

There are many types of elemental technologies.

Maturity of elemental technologies vary.

There are many variations in cost.

There are many variations in applications.

System design and implementation are challenging.

There are many types of user requests.

There are many mounting restrictions such as processor power, power consumption, and circuit size.

There are many types of sensing targets.

Especially, the present technology enables a sensor device that performs environment sensing to perform the sensing using an optimal algorithm as a sensing algorithm that is an algorithm regarding the sensing.

Hereinafter, a mode for carrying out the present technology is described. The description is given in the following order.

1. Program Providing System
2. Use Case of Sensing Program
3. Configuration of Conveyance Robot
4. Operation of Conveyance Robot
5. Variation <Program Providing System>

System Configuration

Figure 1:
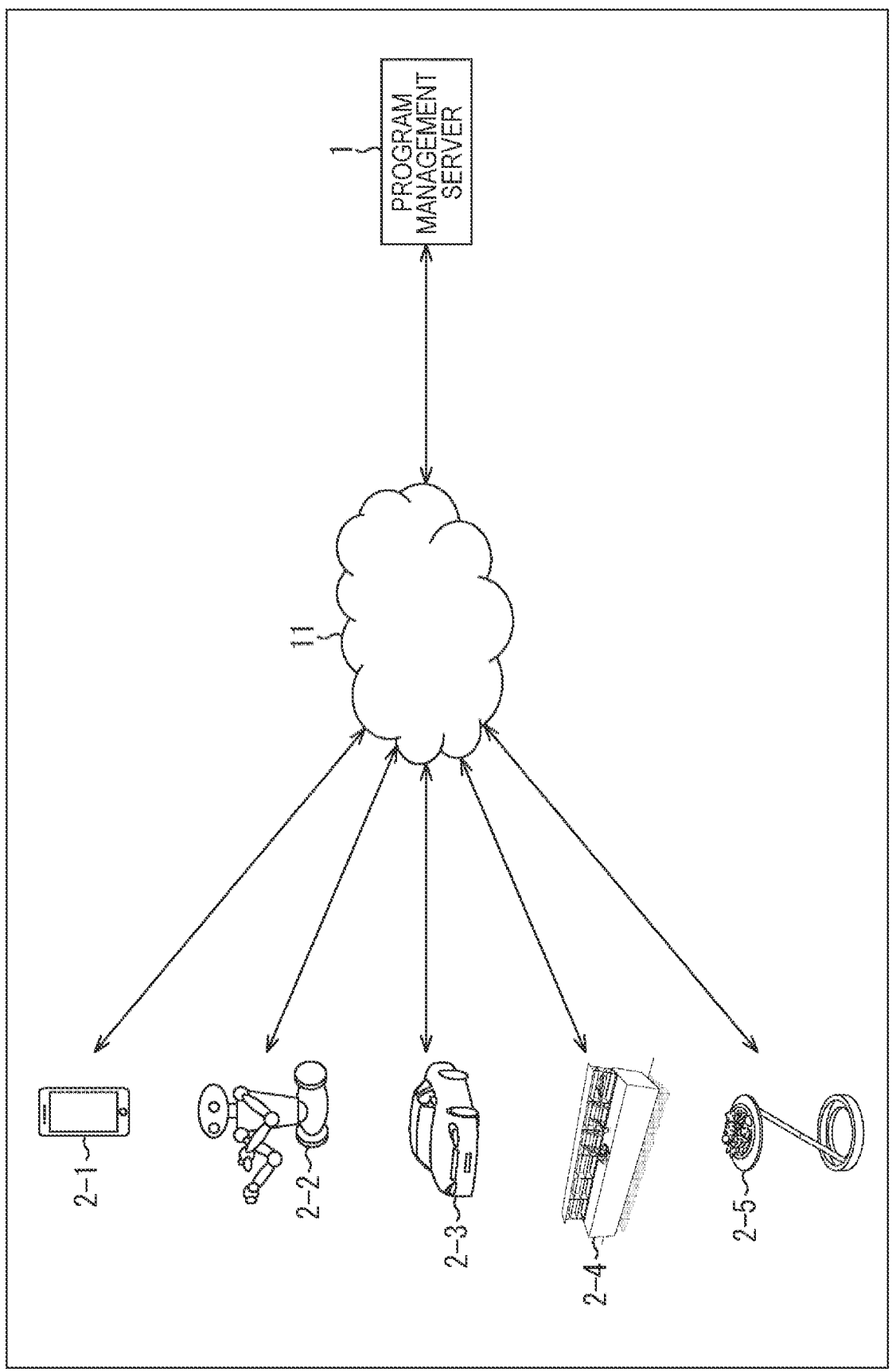
FIG. 1 is a view illustrating a configuration example of a program providing system according to one embodiment of the present technology.

FIG. 1 is a view illustrating a configuration example of a program providing system according to one embodiment of the present technology.

The program providing system in FIG. 1 is formed by connecting various devices such as a mobile terminal 2-1, an arm robot 2-2, a moving body 2-3, a cooking robot 2-4, and a conveyance robot 2-5 to a program management server 1 via a network 11 including the Internet and the like.

The mobile terminal 2-1 is a smartphone.

The arm robot 2-2 is a dual-arm robot. A carriage is provided in a casing of the arm robot 2-2. The arm robot 2-2 is a movable robot.

The moving body 2-3 is an automobile. A function of automated driving and the like is mounted on the moving body 2-3.

The cooking robot 2-4 is a kitchen-type robot. The cooking robot 2-4 has a function of cooking by driving a plurality of cooking arms. An operation similar to a cooking operation performed by a human is reproduced by the cooking arm.

The conveyance robot 2-5 is a robot on a top plate of which prepared as a placing table a conveyance object may be placed, the robot capable of moving to a destination position in this state. A wheel is provided on a base of the conveyance robot 2-5.

Each device illustrated in FIG. 1 is equipped with a sensor device used for sensing of environment, sensing of object, sensing of human and the like.

Figure 2:
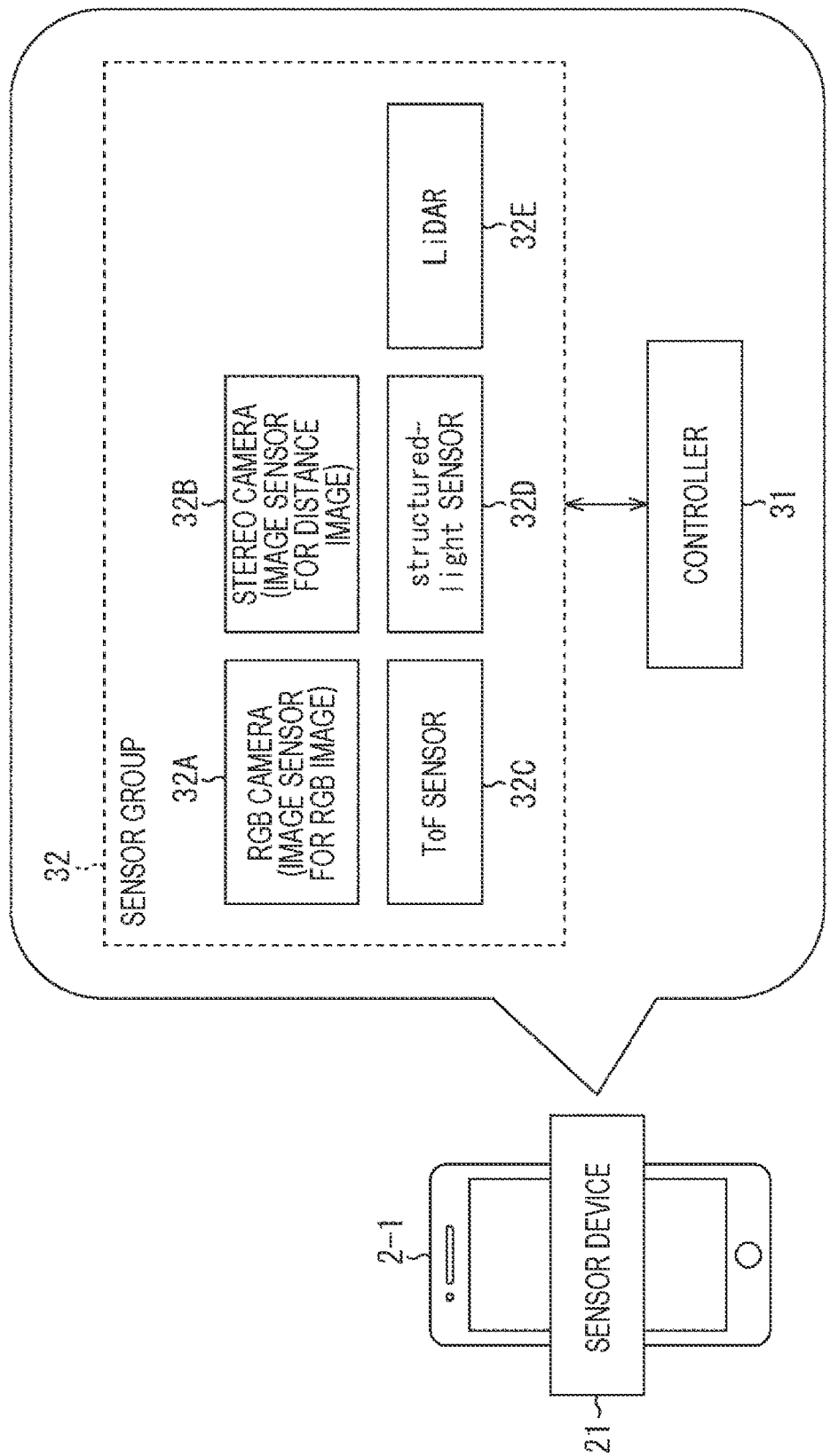
FIG. 2 is a view illustrating a configuration example of a sensor device.

FIG. 2 is a view illustrating a configuration example of the sensor device.

As illustrated in FIG. 2, a sensor device 21 is provided with a controller 31 and a sensor group 32.

The controller 31 controls each sensor forming the sensor group 32 to perform sensing of various targets such as the sensing of environment, sensing of object, and sensing of human. The sensing by the controller 31 is performed on the basis of sensor data output from each sensor forming the sensor group 32.

The controller 31 outputs a sensing result to a device on a host side. Various types of processing are performed by the device on the host side on the basis of the sensing result by the controller 31. In a case where the sensor device 21 is mounted on the mobile terminal 2-1, a central processing unit (CPU) of the smartphone serves as the device on the host side. The controller 31 also has a function of communicating with the device on the host side.

The sensor group 32 includes a plurality of sensors that performs the sensing of various targets. In the example in FIG. 2, the sensor group 32 includes an RGB camera 32A, a stereo camera 32B, a ToF sensor 32C, a structured-light sensor 32D, and a LiDAR 32E.

The RGB camera 32A includes an image sensor for an RGB image. The RGB camera 32A images a peripheral state by driving the image sensor, and outputs the RGB image acquired by the imaging as the sensor data.

The stereo camera 32B is a distance sensor of a stereo camera system, and includes two image sensors for a distance image. The stereo camera 32B outputs the distance image indicating a distance to a target as the sensor data.

The ToF sensor 32C is a distance sensor of a time of flight (ToF) system. The ToF sensor 32C measures the distance to the target by the ToF system, and outputs distance information as the sensor data.

The structured-light sensor 32D is a distance sensor of a structured-light system. The structured-light sensor 32D measures the distance to the target by the structured-light system, and outputs distance information as the sensor data.

A light detection and ranging (LiDAR) 32E measures a three-dimensional position of each point of the target, and outputs information indicating a measurement result as the sensor data.

Sensors different from the sensors illustrated in FIG. 2 such as a positioning sensor, a gyro sensor, an acceleration sensor, a temperature sensor, and an illuminance sensor may be included in the sensor group 32.

A type of the sensor forming the sensor group 32 is appropriately changed depending on the device on which the sensor device 21 is mounted. One sensor may form the sensor group 32.

Figure 3:
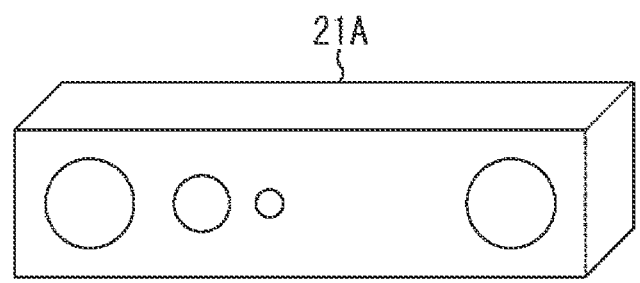
FIG. 3 is a view illustrating a configuration example of an appearance of the sensor device.

The sensor device 21 may include a substrate on which the controller 31 and the sensor group 32 are arranged, or may be formed as a device in which the substrate on which each sensor is arranged is accommodated in a casing 21A as illustrated in FIG. 3.

In the sensor device 21 having such a configuration, the controller 31 executes a sensing program, which is a program for sensing, and implements a sensing function of various targets such as the environment, object, and human. The sensing function of the controller 31 is implemented on the basis of an output of one sensor forming the sensor group 32 or on the basis of a combination of outputs of a plurality of sensors.

The environment sensing (sensing of environment) includes, for example, the following.

Imaging of RGB image using RGB camera 32A
 Measurement of distance to target using outputs of stereo camera 32B, ToF sensor 32C, and structured-light sensor 32D
 Generation of three-dimensional map using output of LiDAR 32E
 Estimation of self-position using three-dimensional map The environment sensed by the sensor device 21 includes various physical states that are states outside the sensor device 21 or outside the device on which the sensor device 21 is mounted that may be expressed as quantitative data by performing the sensing.

The object sensing (sensing of object) includes, for example, the following.

Recognition and identification of target using RGB image imaged by RGB camera 32A
 Measurement of characteristic of target such as shape, size, color, and temperature The object sensed by the sensor device 21 includes various stationary objects and moving objects around the sensor device 21 or around the device on which the sensor device 21 is mounted.

The human sensing (sensing of human) includes, for example, the following.

Recognition of human, recognition of face of human, identification of human using RGB image imaged by RGB camera 32A
 Recognition of specific parts of person such as head, arms, hands, eyes, and nose
 Estimation of position of specific parts including bone estimation
 Estimation of physical feature of human such as body height and body weight
 Estimation of attribute of human such as age and sex The human sensed by the sensor device 21 includes a human around the sensor device 21 or around the device on which the sensor device 21 is mounted.

The controller 31 includes a plurality of programs with different algorithms as the sensing programs for implementing the respective sensing functions.

Figure 4:
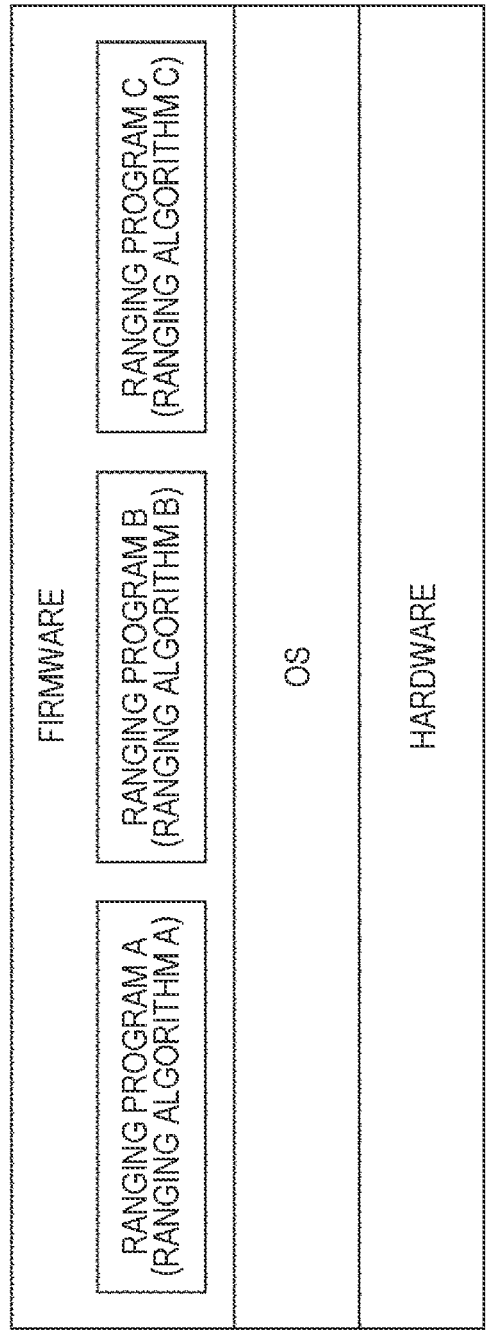
FIG. 4 is a view illustrating an example of a sensing program.

FIG. 4 is a view illustrating an example of the sensing program prepared in the sensor device 21.

In the example in FIG. 4, a ranging program A, a ranging program B, and a ranging program C are prepared as firmware that operates on an operating system (OS). The ranging program A, the ranging program B, and the ranging program C are the sensing programs that implement a ranging function as an environment sensing function.

The ranging program A, the ranging program B, and the ranging program C are the sensing programs that implement the same ranging function by different sensing algorithms. The ranging program A, the ranging program B, and the ranging program C define the different sensing algorithms.

The ranging program A is the sensing program that performs ranging by a ranging algorithm A. The ranging program B is the sensing program that performs ranging by a ranging algorithm B. The ranging program C is the sensing program that performs ranging by a ranging algorithm C.

For example, the ranging algorithms A to C are the sensing algorithms to perform the ranging using different parameters: different parameters are set in the same sensor and the distance is calculated by performing the same calculation on the basis of the output of the sensor.

Furthermore, the ranging algorithms A to C are the sensing algorithms to perform the ranging using different calculation methods: the same parameter is set in the same sensor and the distance is calculated by performing different calculations on the basis of the output of the sensor.

In a case where a plurality of distance sensors such as the stereo camera 32B, the ToF sensor 32C, and the structured-light sensor 32D is prepared, the ranging algorithms A to C may be the sensing algorithms to perform ranging using different distance sensors.

In this case, for example, the ranging algorithm A performs the ranging on the basis of the output of the stereo camera 32B, and the ranging algorithm B performs the ranging on the basis of the output of the ToF sensor 32C. Furthermore, the ranging algorithm C performs the ranging on the basis of the output of the structured-light sensor 32D.

In this manner, in the sensor device 21, a plurality of programs with different sensing algorithms is prepared as the sensing programs for implementing the same ranging function. The sensor used for the ranging is associated with at least any one of each sensing algorithm or a sensing program that defines each sensing algorithm. In a case where the sensing program is executed, an operation of the associated sensor is controlled in conjunction with this.

For example, in the sensor device 21 mounted on the conveyance robot 2-5, the sensing algorithm corresponding to a sensing condition is selected and the ranging is performed. The sensing condition is a condition of selection of the sensing algorithm determined according to a situation of the conveyance robot 2-5.

For example, in a case where the situation is suitable for the ranging algorithm A, the ranging program A is executed, and the ranging is performed using the ranging algorithm A.

Furthermore, in a case where the situation is suitable for the ranging algorithm B, the ranging program B is executed, and the ranging is performed using the ranging algorithm B. In a case where the situation is suitable for the ranging algorithm C, the ranging program C is executed, and the ranging is performed using the ranging algorithm C.

Since the ranging is performed by adaptively selecting the sensing algorithm (sensing program) corresponding to the sensing condition, the ranging by an optimal sensing algorithm becomes possible. The same applies to a case where the sensing target is other than the distance.

One sensing program defines one sensing algorithm. Selecting the sensing program corresponds to selecting the sensing algorithm.

Note that, adaptively selecting the sensing algorithm means selecting the sensing algorithm associated with the sensing condition when this condition is detected. The sensing algorithm considered to be suitable is associated with the sensing condition corresponding to each assumed situation. The association between the sensing condition and the sensing algorithm may be dynamically changed.

Figure 5:
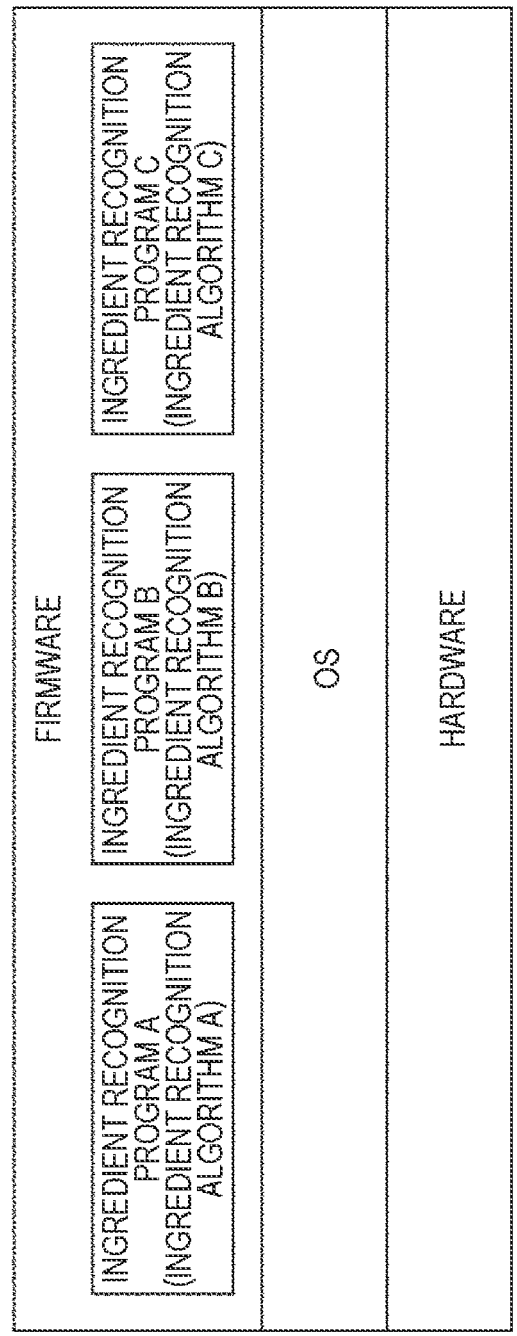
FIG. 5 is a view illustrating another example of the sensing program.

FIG. 5 is a view illustrating another example of the sensing program.

In the example in FIG. 5, an ingredient recognition program A, an ingredient recognition program B, and an ingredient recognition program C are prepared as the firmware that operates on the OS. The ingredient recognition programs A to C are the sensing programs that implement an ingredient recognition function as the object sensing function.

For example, in the sensor device 21 mounted on the cooking robot 2-4, the sensing algorithm corresponding to the sensing condition determined by a cooking process and the like is selected and the ingredient is recognized.

Figure 6:
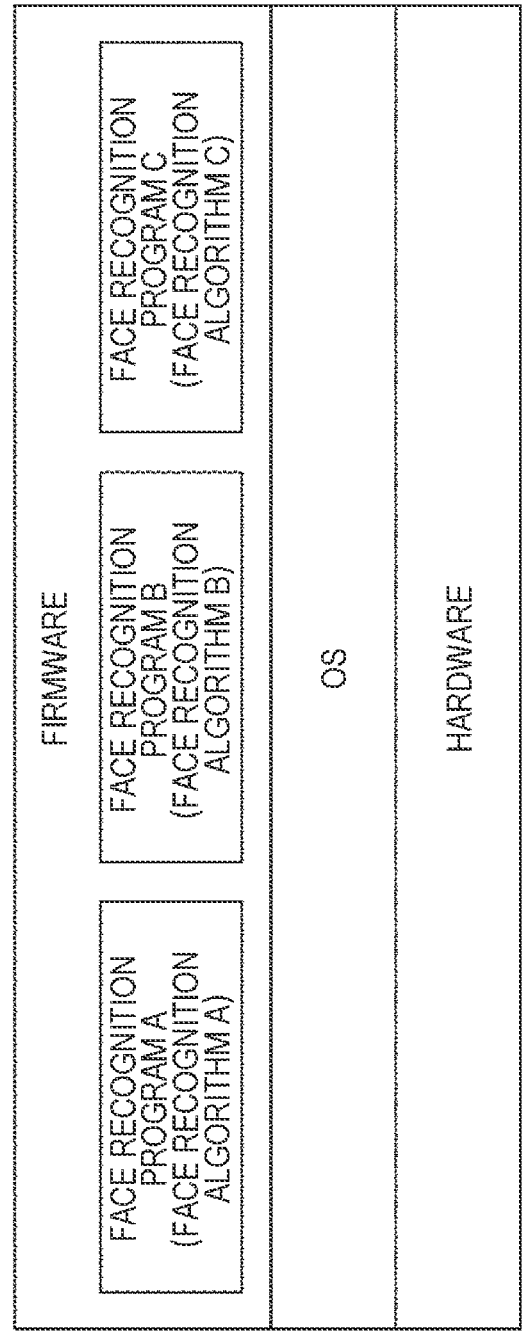
FIG. 6 is a view illustrating still another example of the sensing program.

FIG. 6 is a view illustrating still another example of the sensing program.

In the example in FIG. 6, a face recognition program A, a face recognition program B, and a face recognition program C are prepared as the firmware that operates on the OS. The face recognition programs A to C are the sensing programs that implement a face recognition function as the human sensing function.

For example, in the sensor device 21 mounted on the cooking robot 2-4, the sensing algorithm corresponding to the sensing condition determined by the cooking process and the like is selected and the face is recognized.

Updating of Sensing Program

In the program providing system in FIG. 1, the sensing program prepared as the firmware in the sensor device 21 of each device may be updated.

Figure 7:
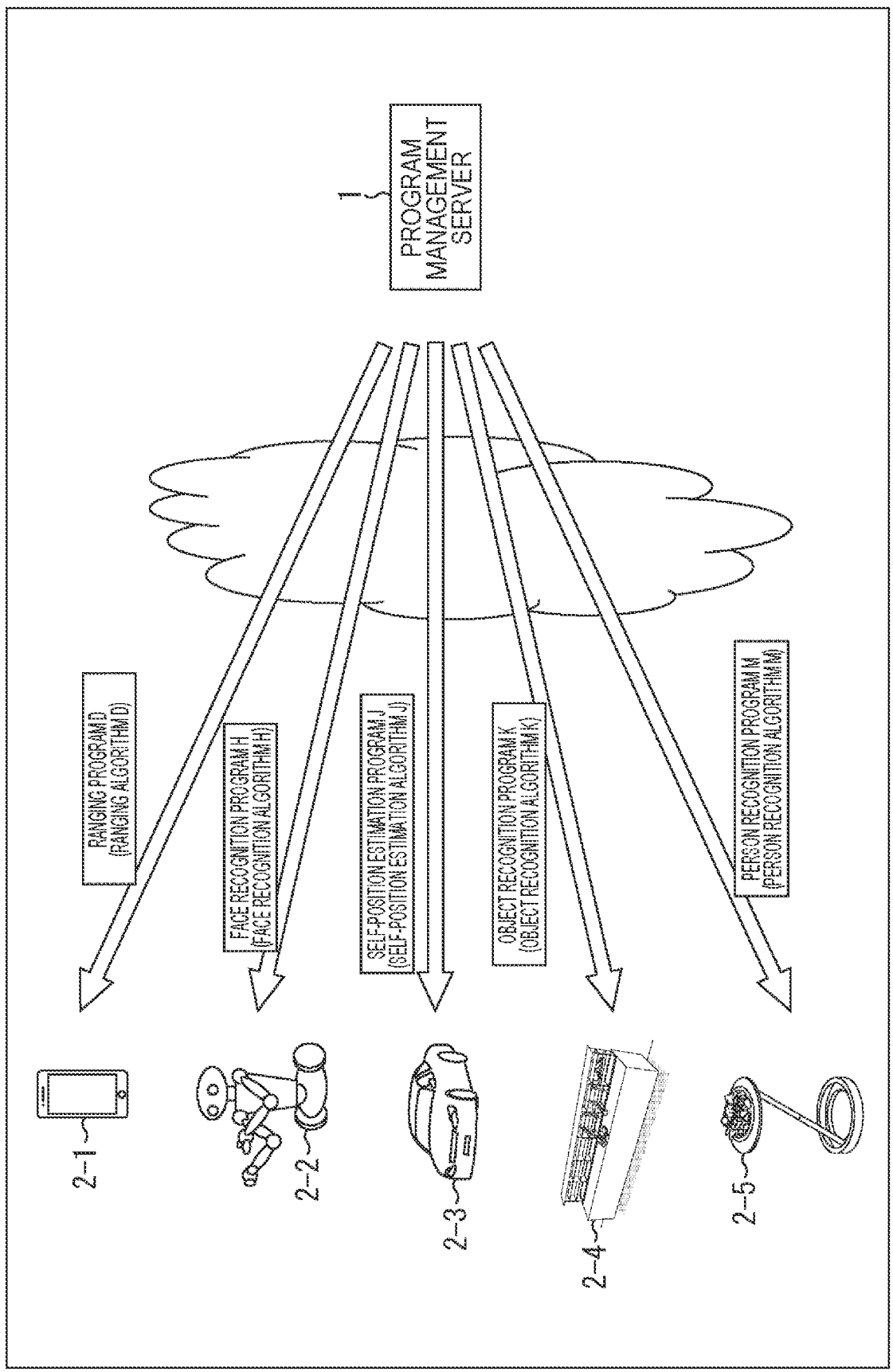
FIG. 7 is a view illustrating an example of updating of the sensing program.

FIG. 7 is a view illustrating an example of updating of the sensing program.

As indicated by an arrow in FIG. 7, the program management server 1 provides the sensing program to each device. The program management server 1 includes a database (DB) of the sensing program to be provided to each device.

In the example in FIG. 7, a ranging program D that performs the ranging by a ranging algorithm D is provided to the mobile terminal 2-1, and a face recognition program H that performs the face recognition by a face recognition algorithm H is provided to the arm robot 2-2.

Furthermore, a self-position estimation program J that performs self-position estimation by a self-position estimation algorithm J is provided to the moving body 2-3, and an object recognition program K that performs object recognition by an object recognition algorithm K is provided to the cooking robot 2-4. A person recognition program M that performs person recognition by a person recognition algorithm M is provided to the conveyance robot 2-5.

Figure 8:
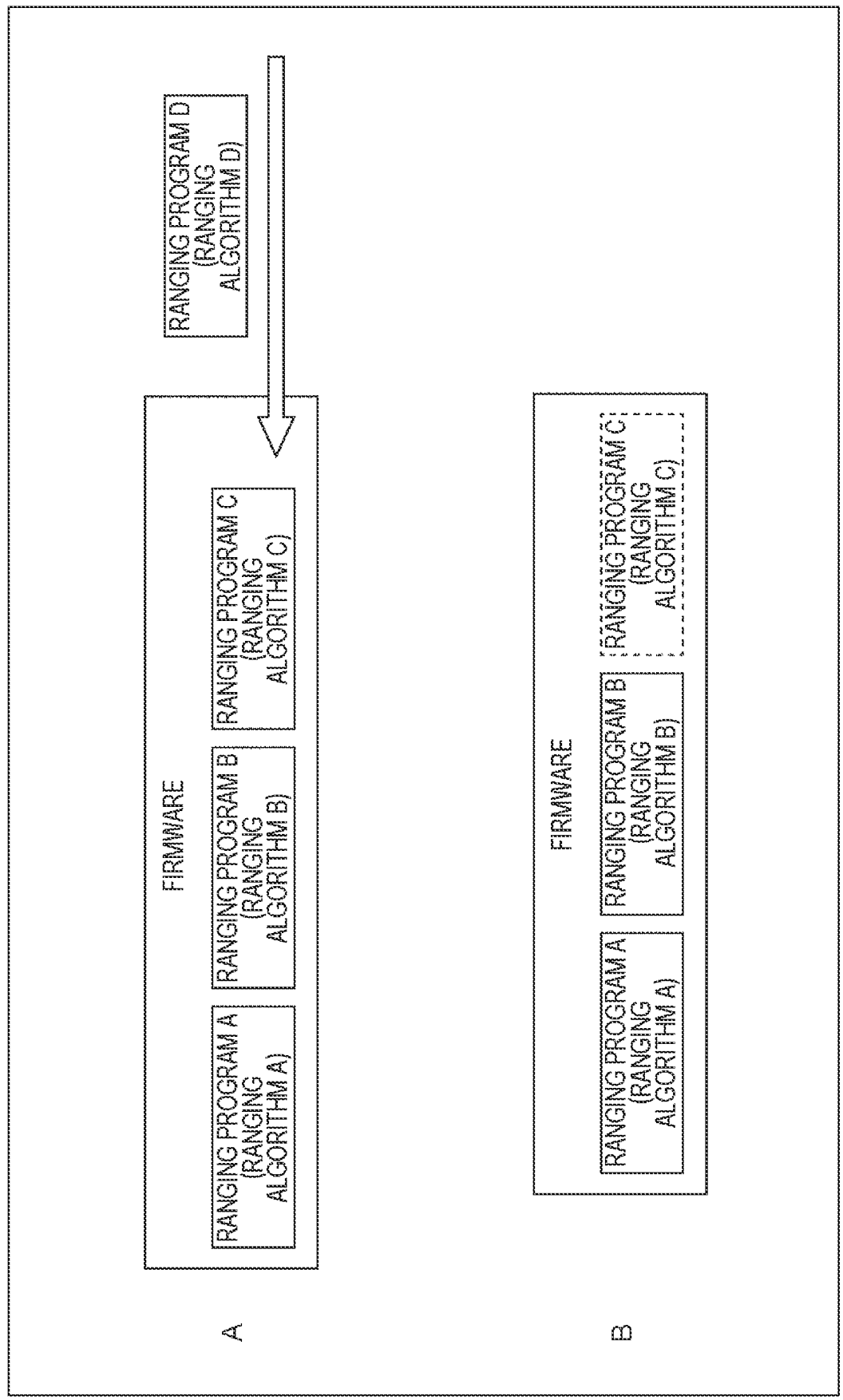
FIG. 8 is a view illustrating an example of updating of the sensing program.

FIG. 8 is a view illustrating an example of updating of the sensing program.

In the sensor device 21 of each device, the sensing program may be added as illustrated in A of FIG. 8. In the example in A of FIG. 8, the ranging program D that performs the ranging by the ranging algorithm D is added to the ranging programs A to C that perform the ranging by the ranging algorithms A to C, respectively.

In a default state, the sensing program that defines the sensing algorithm corresponding to a general situation is prepared in the sensor device 21 of each device. Even in a case of a situation to which the sensor device 21 of each device cannot respond with the sensing program prepared in advance, this may respond to a special situation by adding the sensing program that defines the sensing algorithm corresponding to such special situation.

Furthermore, as illustrated in B of FIG. 8, it is also possible to delete (uninstall) an unnecessary program. In the example in B of FIG. 8, the ranging program C out of the ranging programs A to C is deleted as indicated by a broken line frame.

Figure 9:
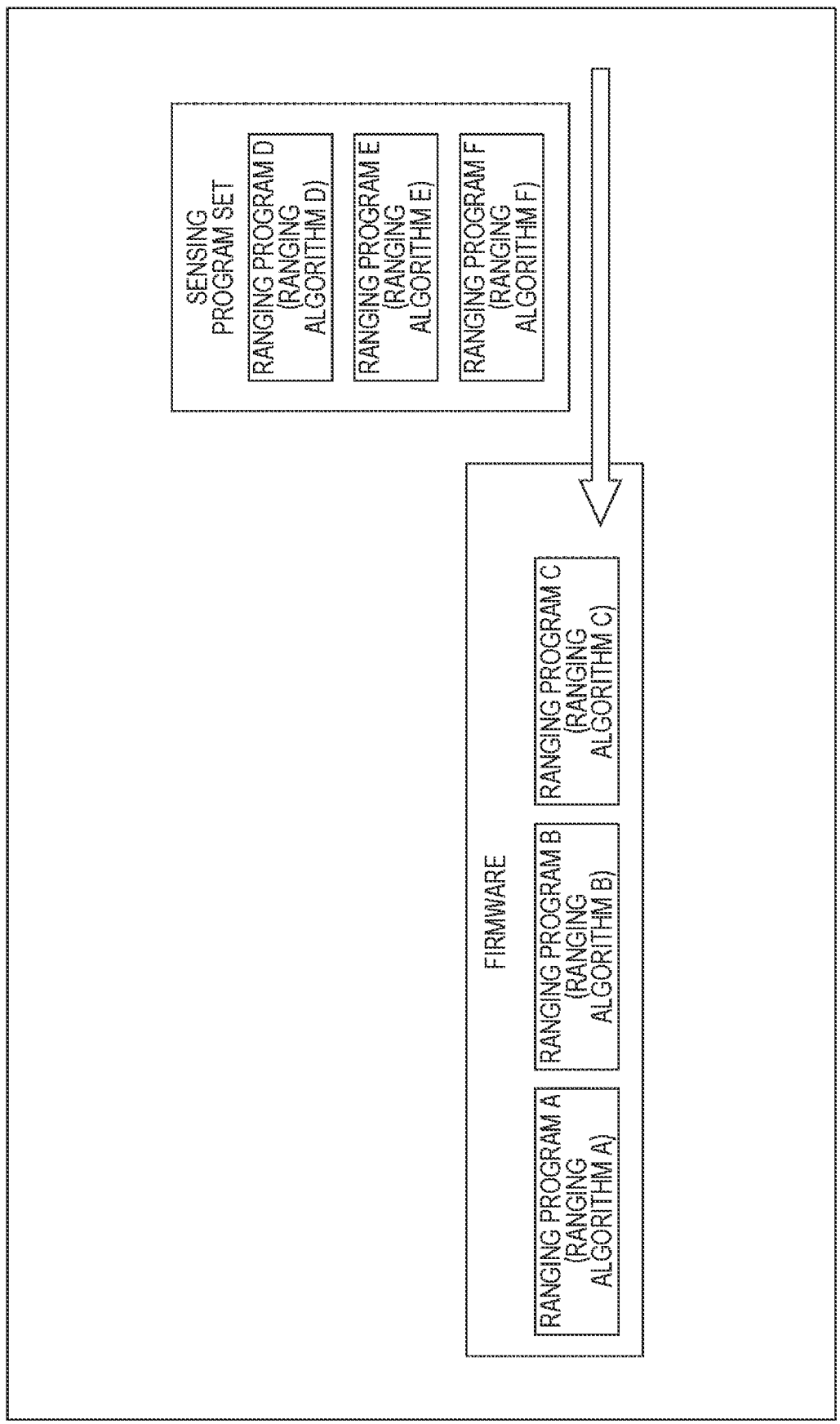
FIG. 9 is a view illustrating another example of updating of the sensing program.

FIG. 9 is a view illustrating another example of updating of the sensing program.

As illustrated in FIG. 9, the updating may be performed in units of sensing program set including a plurality of sensing programs. In the example in FIG. 9, a sensing program set including the ranging program D that performs the ranging by the ranging algorithm D, a ranging program E that performs the ranging by a ranging algorithm E, and a ranging program F that performs the ranging by a ranging algorithm F is provided by the program management server 1 to be added.

Figure 10:
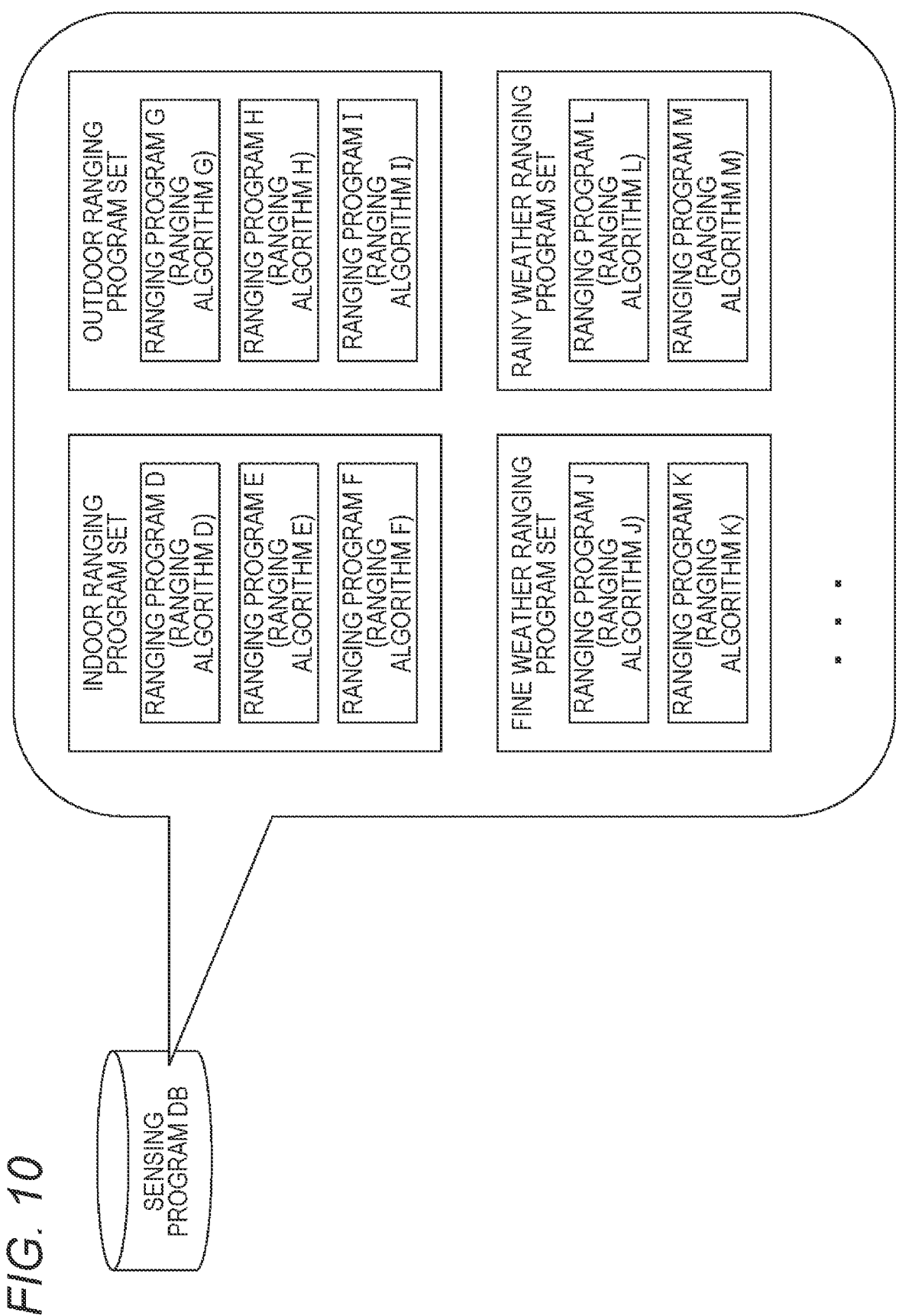
FIG. 10 is a view illustrating an example of a sensing program set.

In the DB of the program management server 1, as illustrated in FIG. 10, a plurality of sensing program sets in which a plurality of sensing programs is collected for each use condition such as a place, a situation, and a purpose is prepared.

In the example in FIG. 10, a sensing program set for indoor ranging and a sensing program set for outdoor ranging are prepared. These sensing program sets are the sensing program sets corresponding to places.

The sensing program set corresponding to the place is, for example, the set used in the sensor device 21 mounted on a device having a moving function. Among the same indoors, the sensing program sets may be prepared in units of finer places such as a sensing program set for a kitchen and a sensing program set for a dining room.

It is also possible to prepare the sensing program sets for various places such as a sensing program set for the sea, a sensing program set for a mountain, and a sensing program set for inside of a train.

Furthermore, in the example in FIG. 10, a sensing program set for ranging in fine weather and a sensing program set for ranging in rainy weather are prepared. These sensing program sets are the sensing program sets corresponding to weather.

The sensing program set corresponding to weather is, for example, the set used in the sensor device 21 mounted on a device having a moving function and may move outdoors. It is also possible to prepare the sensing program sets for various changing situations such as a sensing program set for each time of the day such as morning, noon, and night, a sensing program set for each brightness, and a sensing program set for each temperature.

It is also possible to prepare the sensing program sets for various purposes such as a sensing program set when running, a sensing program set when playing baseball, a sensing program set when cooking curry, and a sensing program set when cooking salad.

The sensor device 21 of each device may collectively add the sensing programs by specifying an ID of the sensing program set corresponding to a use condition. The ID as identification data is set in each sensing program set. The ID as the identification data is also set in each sensing program forming the sensing program set.

Figure 11:
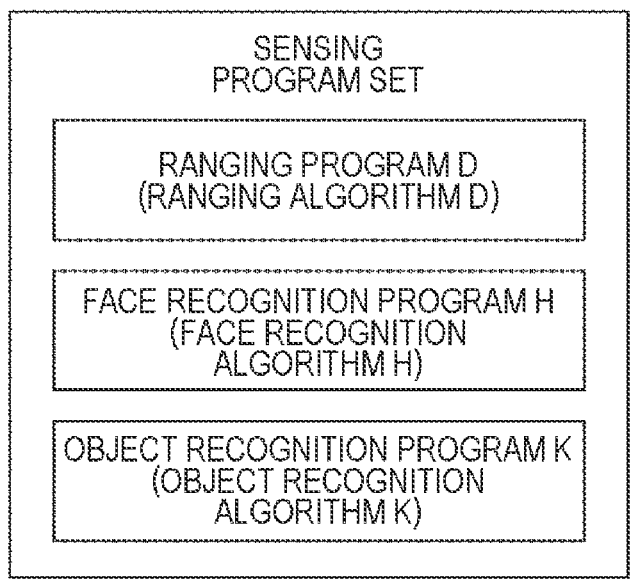
FIG. 11 is a view illustrating an example of the sensing program set.

In place of the set of the sensing programs that implement the same ranging function by different sensing algorithms, the set of the sensing programs that implements different functions may be added as illustrated in FIG. 11.

In the example in FIG. 11, the sensing program set includes the ranging program D, the face recognition program H, and the object recognition program K. The ranging program D is the sensing program that performs the ranging by the ranging algorithm D, and the face recognition program H is the sensing program that performs the face recognition by the face recognition algorithm H. The object recognition program K is the sensing program that performs the object recognition by the object recognition algorithm K.

Figure 12:
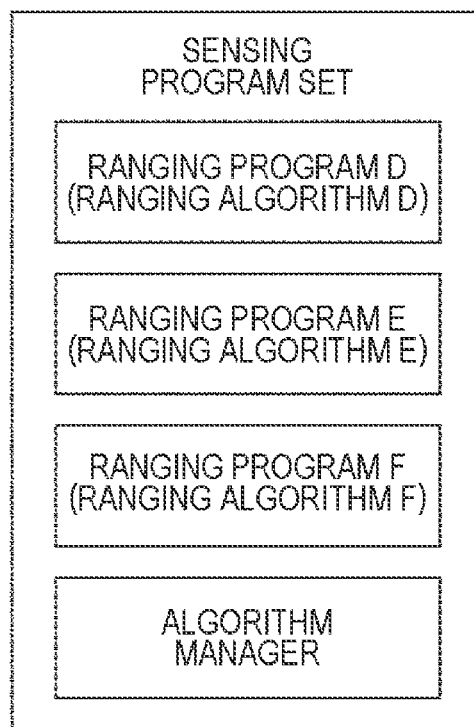
FIG. 12 is a view illustrating an example of the sensing program set.

FIG. 12 is a view illustrating an example of the sensing program set.

The sensing program set illustrated in FIG. 12 includes an algorithm manager that is a program that controls adaptive selection of the algorithm.

The sensor device 21 executes the algorithm manager and selects the sensing algorithm corresponding to the sensing condition. In the algorithm manager, a combination of information indicating a type of the sensing program that controls the execution and information indicating execution order of the sensing programs is set.

Figure 13:
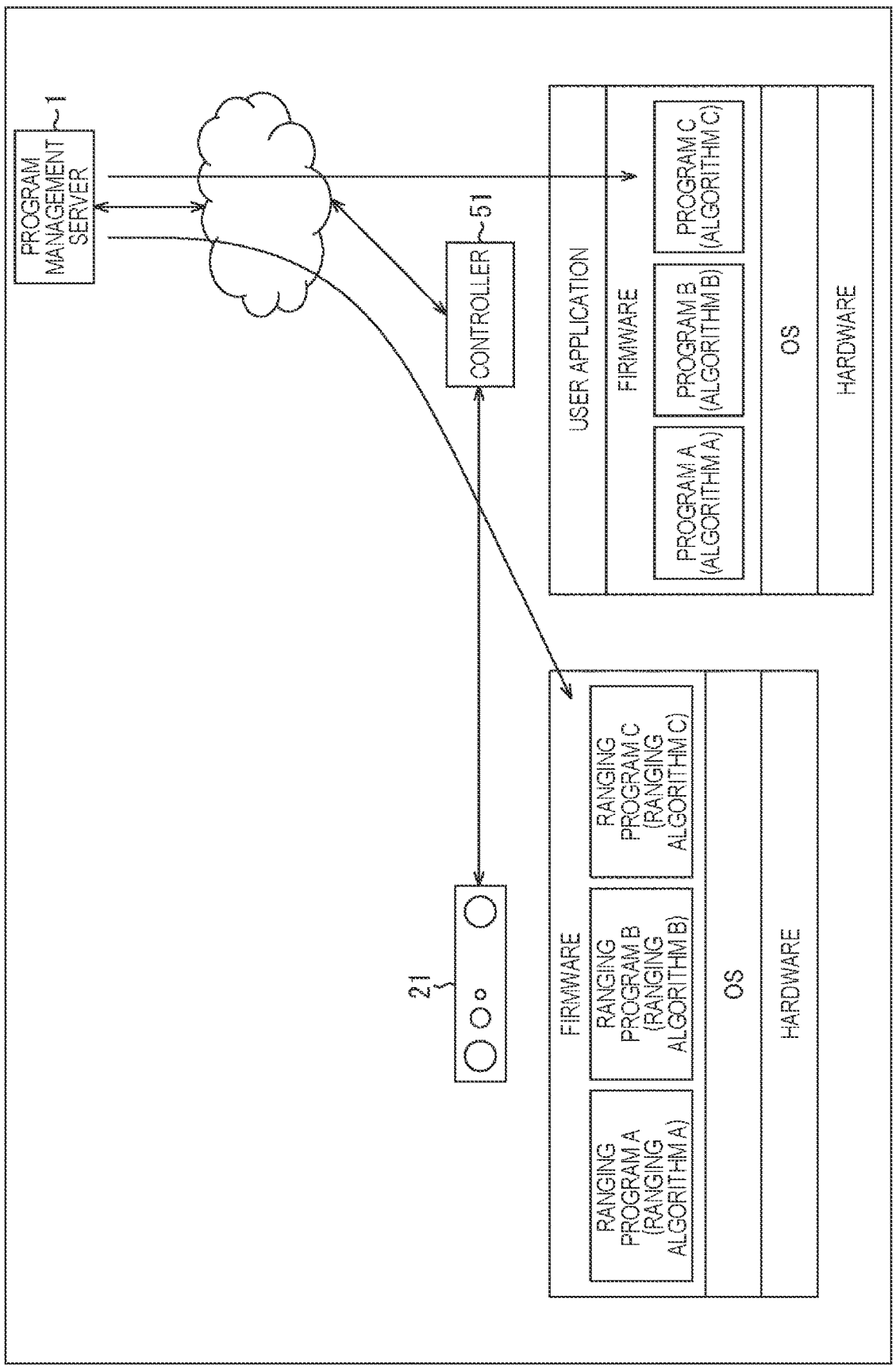
FIG. 13 is a view illustrating an example of updating of the sensing program.

FIG. 13 is a view illustrating an example of updating of the sensing program.

The sensing program may be executed in each of the sensor device 21 and a controller 51, which is the device on the host side, and a predetermined function may be implemented. In this case, the sensing program of the controller 51 may be updated similarly to the sensing program of the sensor device 21. The controller 51 is, for example, a data processing device on the host side such as the CPU of the mobile terminal 2-1 and a CPU of a PC mounted on the arm robot 2-2.

A sensing program that updates the firmware of the sensor device 21 and a sensing program that updates the firmware of the controller 51 may be included in one sensing program set to be provided.

The sensing program and the sensing program set may be provided for a fee or for free. One sensing program set may include both a paid sensing program and a free sensing program.

When updating the sensing program as described above, the sensor device 21 may be authenticated by the program management server 1 on the basis of key information for authentication, and the updating may be performed in a case where it is confirmed that the sensor device is a legitimate device. The key information for authentication is prepared as unique information in each sensor device 21.

The authentication of the sensor device 21 using the key information for authentication may be performed not when the sensing program is updated but when the sensing program is executed.

Provision Source of Sensing Program

Figure 14:
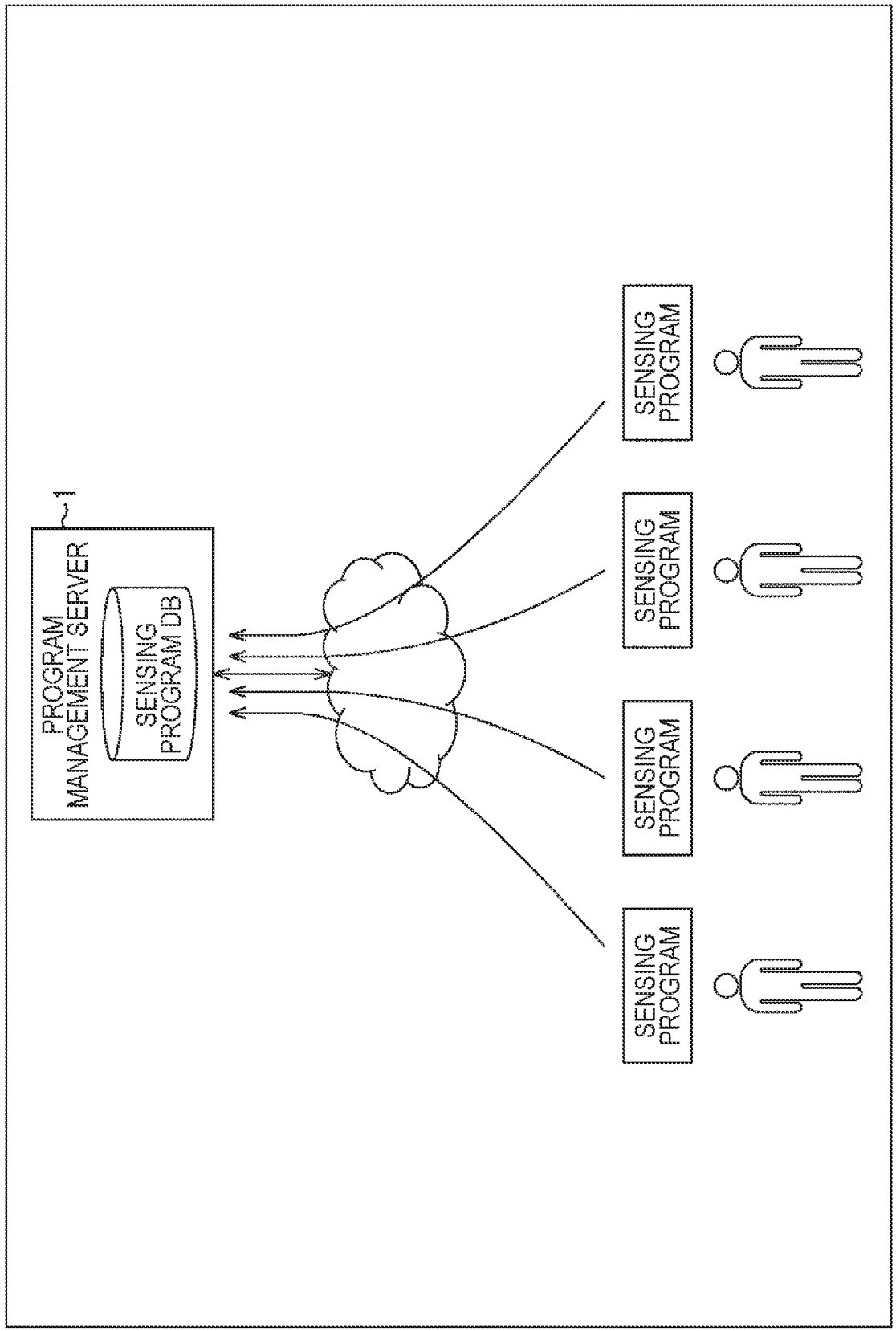
FIG. 14 is a view illustrating an example of a provision source of the sensing program.

FIG. 14 is a view illustrating an example of a provision source of the sensing program.

As illustrated in FIG. 14, the sensing program provided from the program management server 1 to each device is developed by, for example, a developer that performs user registration of a service in the program providing system. Each developer is provided with information regarding a specification of the sensor device 21 and a development tool such as a software development kit (SDK) by a service provider that operates the service using the program providing system.

Each developer develops the sensing program or the sensing program set by using the SDK and the like, and uploads the same from its own computer to the program management server 1. The uploaded sensing program and sensing program set are stored in the sensing program DB to be managed.

The program management server 1 manages a using situation of each sensing program and sensing program set such as the number of times of installation and the number of times of execution in each device. A predetermined incentive such as payment of an amount of money corresponding to the using situation and issuance of points may be provided from the service provider to the developer.

Figure 15:
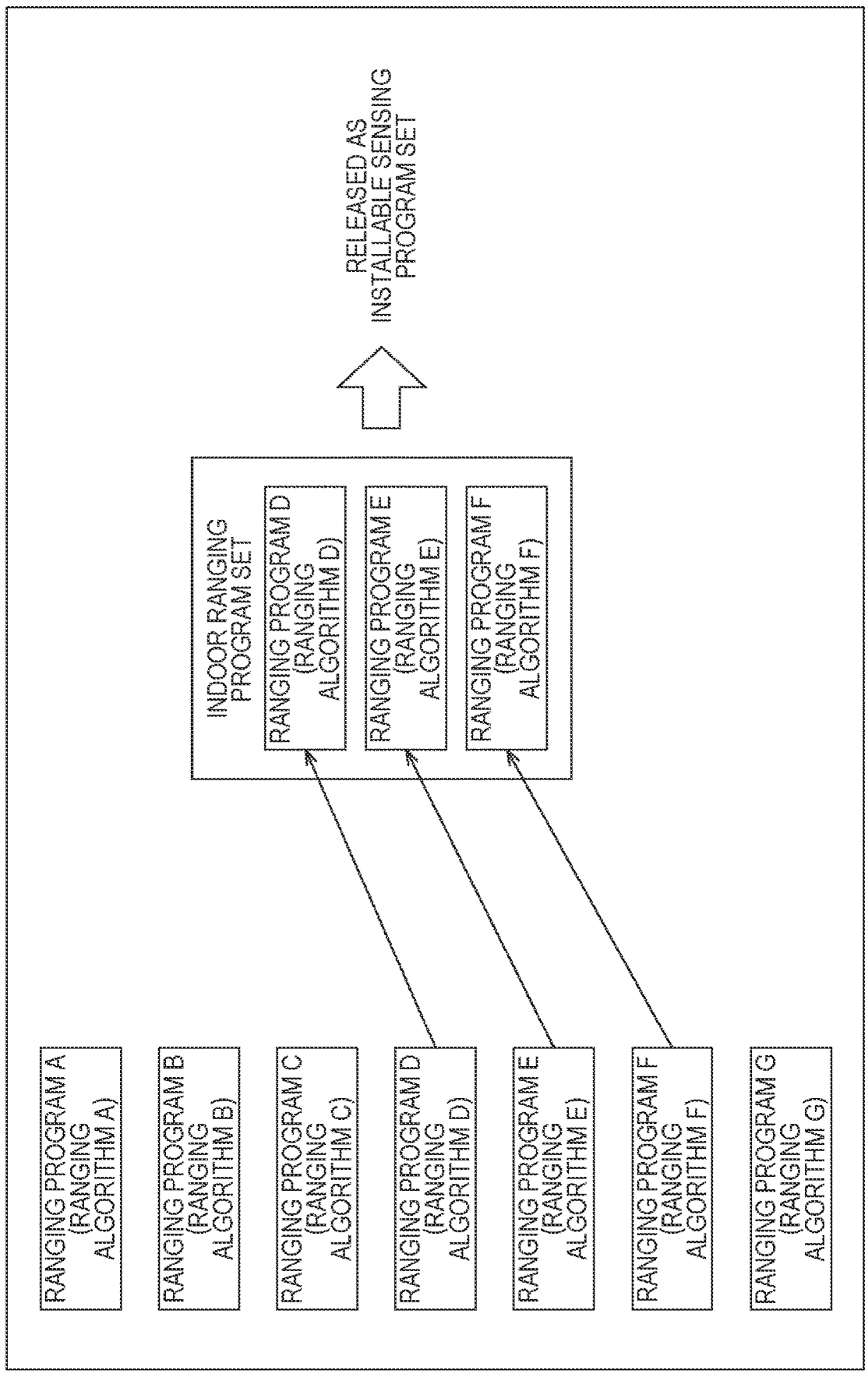
FIG. 15 is a view illustrating an example of generation of a program set.

FIG. 15 is a view illustrating an example of generation of the sensing program set.

The sensing program set may be generated by any user by putting together the sensing programs developed and uploaded by each developer.

In the example in FIG. 15, the indoor ranging program set is generated by putting together three sensing programs: the ranging program D, the ranging program E, and the ranging program F among the ranging programs A to G.

The indoor ranging program set generated in this manner is released by the program management server 1 as an installable sensing program set, and is appropriately installed on a predetermined device similarly to the sensing program set developed by the developer.

An incentive may be provided to the user who generates the program set by putting together the plurality of sensing programs.

<Use Case of Sensing Program>

Use Case of Conveyance Robot

Here, a use case of the environment sensing is described.

In a case where the conveyance robot 2-5 conveys the conveyance object, the sensor device 21 mounted on the conveyance robot 2-5 performs the environment sensing by executing the sensing program. In order to safely move to a destination, detection of an obstacle, measurement of a distance to the obstacle, estimation of a direction of the obstacle, estimation of a self-position and the like are performed as the environment sensing.

Figure 16:
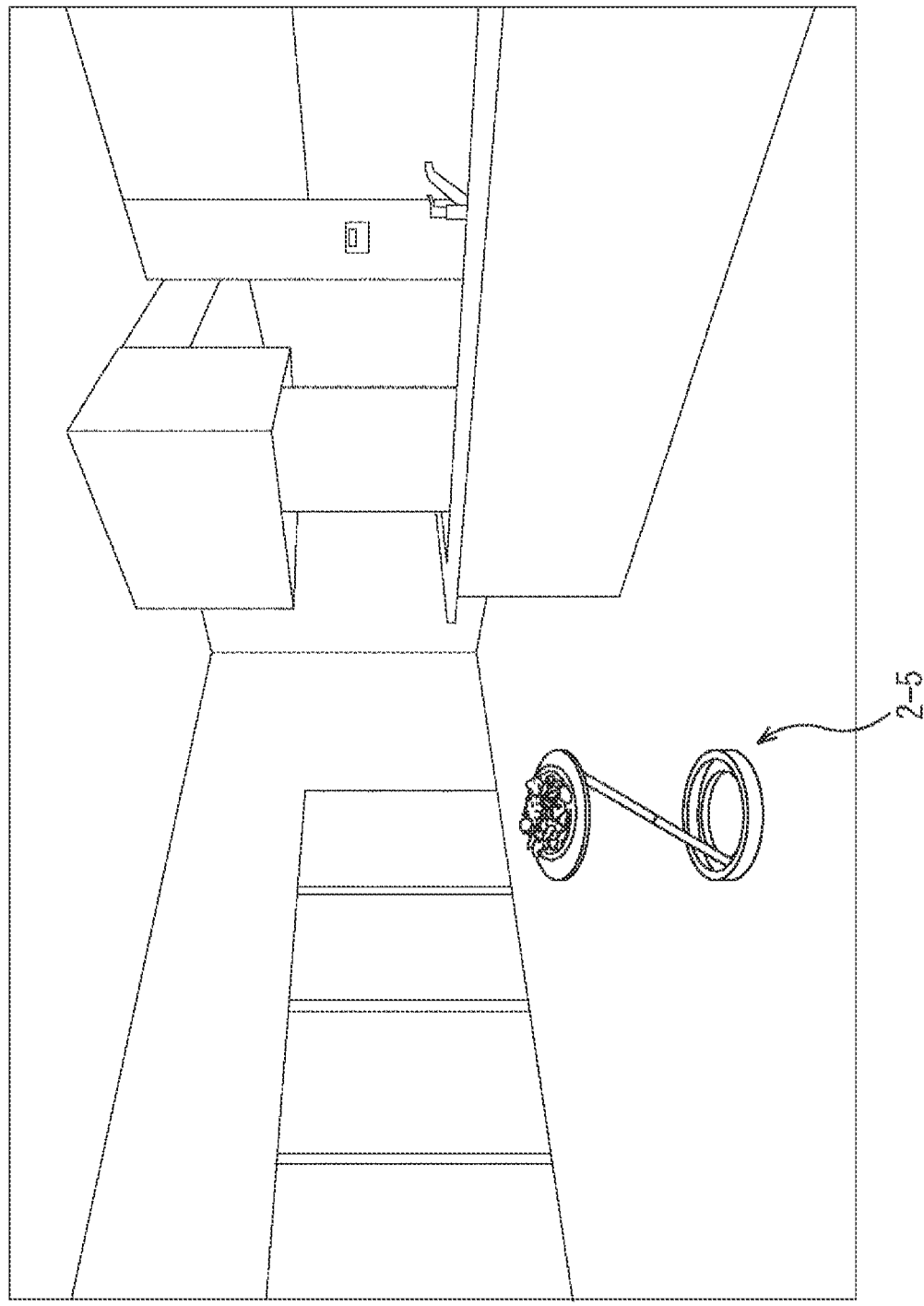
FIG. 16 is a view illustrating a state of conveyance by a conveyance robot.

FIG. 16 is a view illustrating a state of conveyance by the conveyance robot 2-5.

FIG. 16 illustrates a state of the conveyance robot 2-5 that moves in a kitchen in a building. A cooked dish is placed on the top plate prepared as the placing table for the conveyance object. In this example, the conveyance robot 2-5 is used for serving the dish.

The conveyance robot 2-5 plans a moving route, avoids the obstacle and the like on the basis of a result of the environment sensing by the sensor device 21, moves to the destination, and serves the dish.

Figure 17:
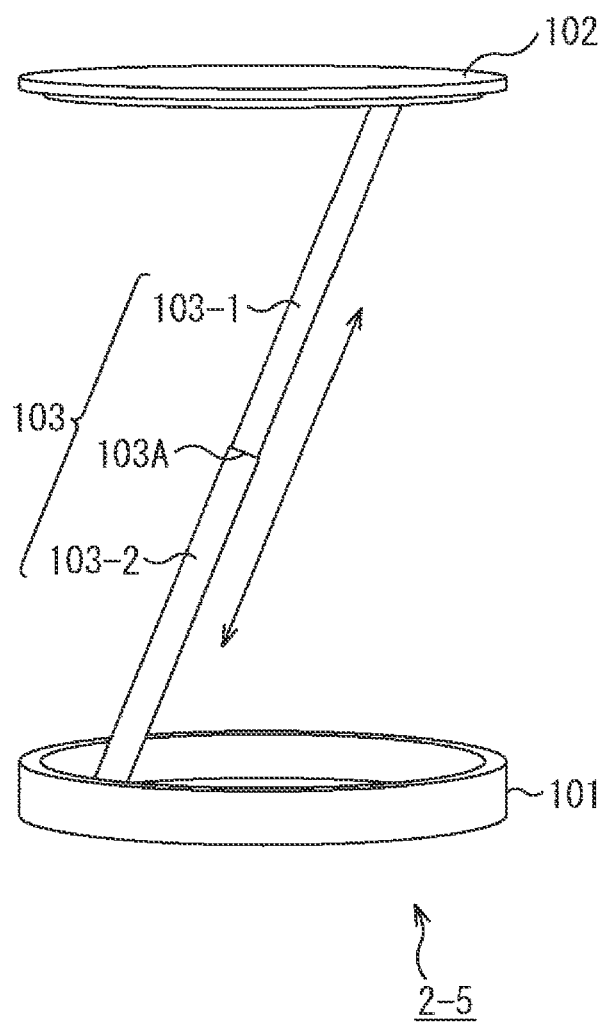
FIG. 17 is an enlarged view of an appearance of the conveyance robot.

FIG. 17 is an enlarged view of an appearance of the conveyance robot 2-5.

As illustrated in FIG. 17, the conveyance robot 2-5 is formed by connecting an annular base 101 and a circular thin plate-shaped top plate 102 with a thin rod-shaped support arm 103. A plurality of tires is provided on a bottom surface side of the base 101. The base 101 serves as a moving unit that implements the movement of the conveyance robot 2-5.

A radial length of the base 101 and a radial length of the top plate 102 are substantially the same. In a case where there is the top plate 102 substantially directly above the base 101, the support arm 103 is in an oblique state as illustrated in FIG. 17.

The support arm 103 includes an arm member 103-1 and an arm member 103-2. A diameter of the arm member 103-1 on the top plate 102 side is slightly smaller than a diameter of the arm member 103-2 on the base 101 side. When the arm member 103-1 is accommodated inside the arm member 103-2 at an extension/contraction unit 103A, a length of the support arm 103 is adjusted as indicated by a bidirectional arrow.

An angle of the support arm 103 may be adjusted at each of a connection between the base 101 and the support arm 103 and a connection between the top plate 102 and the support arm 103.

Figure 18:
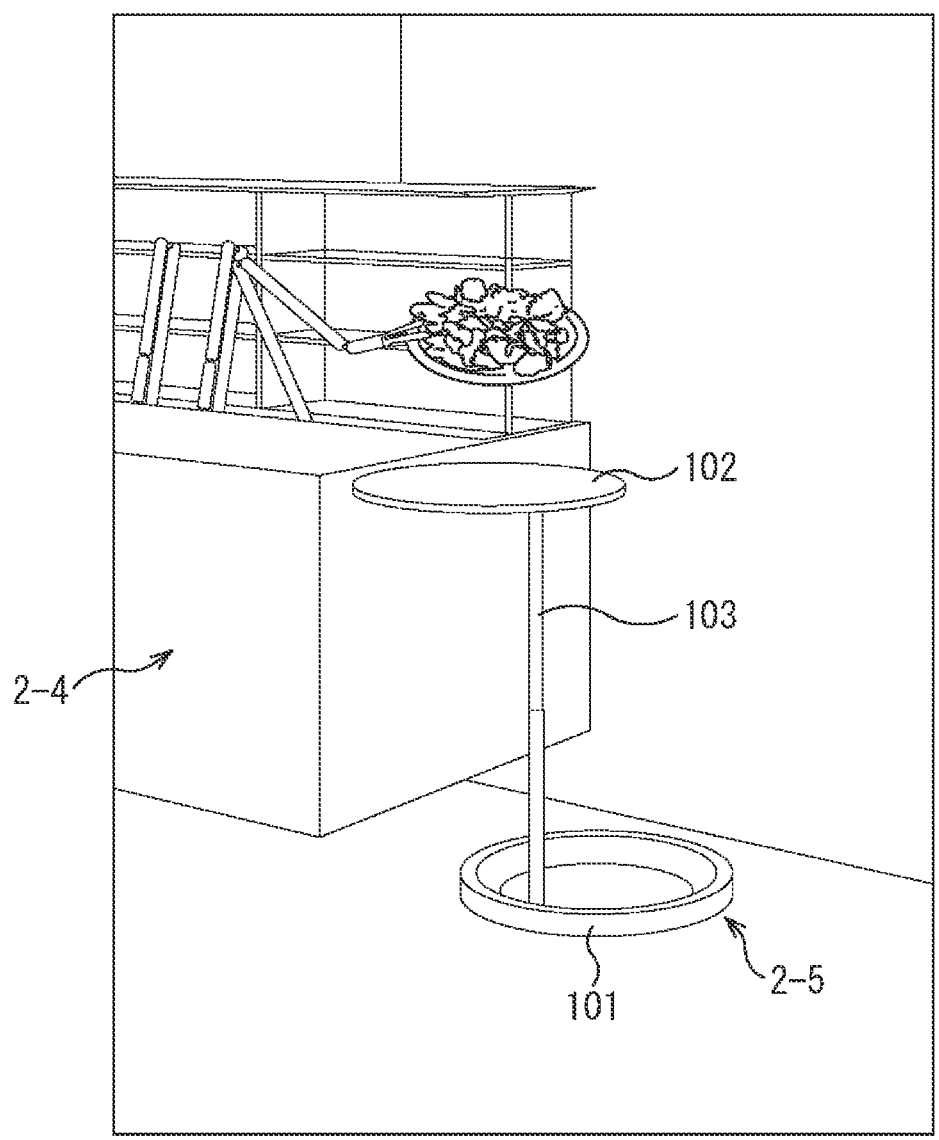
FIG. 18 is a view illustrating an example of an attitude of the conveyance robot when a dish is placed thereon.

FIG. 18 is a view illustrating an example of an attitude of the conveyance robot 2-5 when the dish is placed thereon.

In the example in FIG. 18, by setting the support arm 103 substantially vertically and setting the length thereof to a maximum length, a height of the top plate 102 is adjusted to be substantially the same as a height of a top plate of the cooking robot 2-4.

When the conveyance robot 2-5 is in such a state, the cooking arm of the cooking robot 2-4 places the dish on the top plate 102. In the example in FIG. 18, the dish completed by the cooking operation of the cooking robot 2-4 is placed by the cooking arm.

As illustrated in FIG. 18, the cooking robot 2-4 is provided with a plurality of cooking arms that performs various cooking operations such as cutting of an ingredient and roasting of the ingredient. The cooking operation by the cooking arm is performed in accordance with cooking data that defines contents and order of the cooking operations. The cooking data includes information regarding each cooking process until the dish is completed.

In this manner, the dish served by the conveyance robot 2-5 is the dish cooked by the cooking robot 2-4. A dish made by a human may be placed on the top plate 102 by the human and served.

Figure 19:
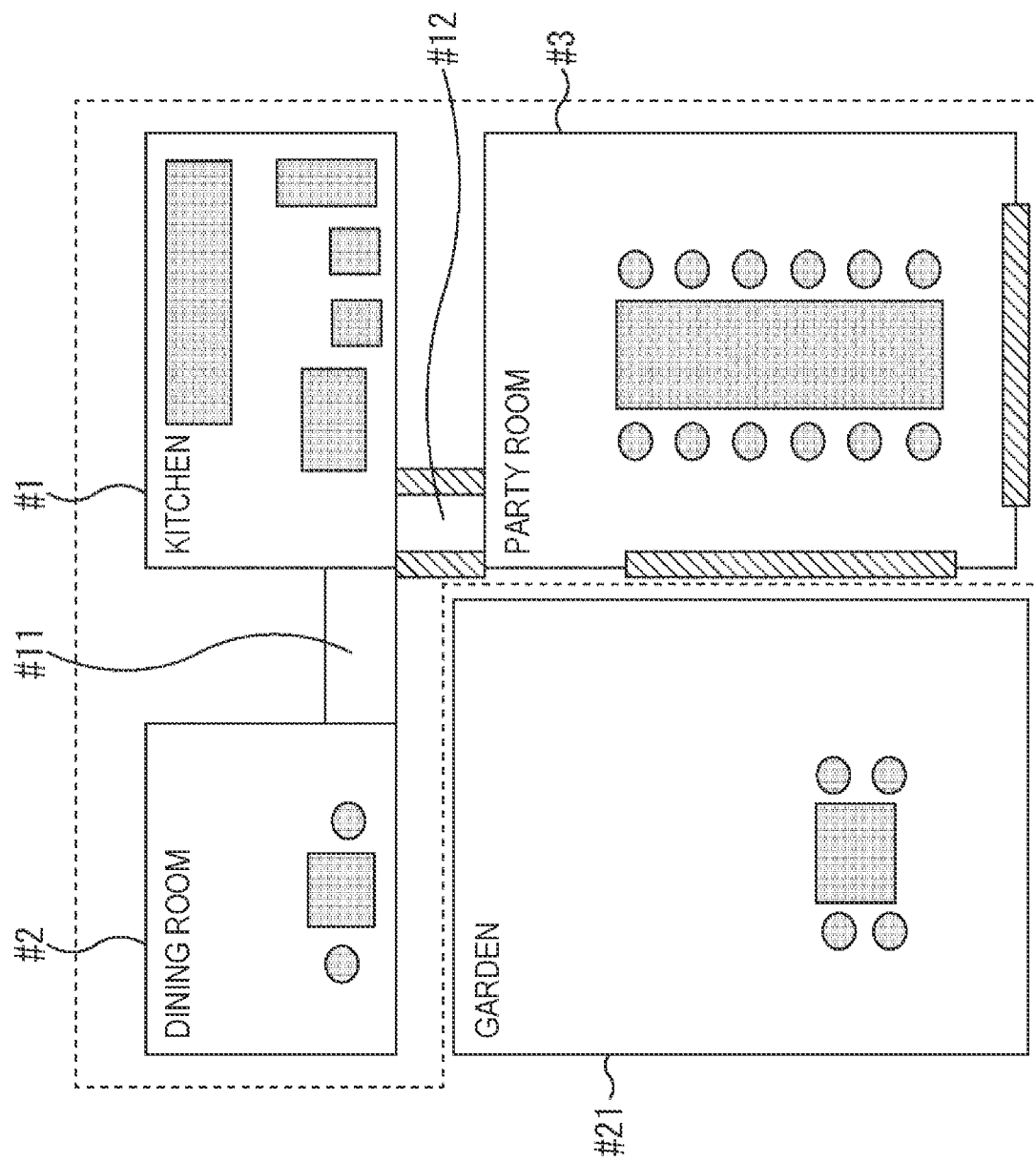
FIG. 19 is a plan view illustrating a layout of a space in which the conveyance robot moves.

FIG. 19 is a plan view illustrating a layout of a space in which the conveyance robot 2-5 moves.

As illustrated in FIG. 19, each room including a kitchen #1, a dining room #2, and a party room #3 is prepared in a building in which the conveyance robot 2-5 moves. There is a corridor #11 between the kitchen #1 and the dining room #2, and a corridor #12 between the kitchen #1 and the party room #3.

Outside the building in FIG. 19 a range of which is indicated by a broken line, a garden #21 is provided so as to face the dining room #2 and the party room #3. As indicated with a hatch, a large window is provided on a wall of the party room #3 including a wall on a side of the garden #21. Windows are also provided on both sides of the corridor #12.

A sensing algorithm used in a case where the conveyance robot 2-5 moves in such a space and serves a dish is described.

Specific Example of Sensing Algorithm

FIG. 20 is a view illustrating an example of the sensing algorithm defined by the sensing program prepared in the sensor device 21 of the conveyance robot 2-5.

As illustrated in FIG. 20, the sensor device 21 of the conveyance robot 2-5 is provided with a program that defines each of algorithms A1 to A9. The algorithms A1 to A9 are the sensing algorithms for environment sensing used when serving the dish.

Note that, in the following, for convenience of description, a case where the environment sensing is performed using the stereo camera 32B provided on the sensor device 21 is mainly described. Depending on the algorithm, the output of the ToF sensor 32C is used.

As illustrated in FIG. 20, the algorithm A1 is divided into an algorithm A1-1 and an algorithm A1-2.

The algorithm A1 is used as, for example, a default sensing algorithm.

The algorithm A1-1 is the sensing algorithm with high accuracy although this may be used only in a narrow place. Responsiveness of the algorithm A1-1 is lower than a reference speed. The responsiveness is a time required for the environment sensing.

The environment sensing by the algorithm A1-1 is performed with imaging resolution of the stereo camera 32B set higher than reference resolution. Since the environment sensing is performed on the basis of an image having high resolution and a large data amount, a processing speed decreases and the responsiveness decreases, but the accuracy increases.

Furthermore, the output of the ToF sensor 32C is also used for the environment sensing by the algorithm A1-1. At the time of environment sensing by the algorithm A1-1, a detection range of the ToF sensor 32C is set as a range narrower than a reference size. Furthermore, power for driving the ToF sensor 32C is set as power stronger than reference power.

The algorithm A1-2 is the sensing algorithm with lower accuracy than that of the algorithm A1-1 although this may be used in a wider place than that with the algorithm A1-1.

The environment sensing by the algorithm A1-2 is performed with imaging resolution of the stereo camera 32B set lower than the imaging resolution of the algorithm A1-1. Since the environment sensing is performed on the basis of an image having slightly lower resolution and a small data amount, a processing speed increases and the responsiveness increases as compared to the algorithm A1-1, but the accuracy decreases.

Furthermore, the environment sensing by the algorithm A1-2 is performed with a baseline length of the stereo camera 32B set longer than the baseline length with the algorithm A1-1. A distance is measured using the stereo camera 32B using parallax between two cameras. By increasing the baseline length represented as the distance between the two cameras, it is possible to measure the distance to a distant target.

The algorithm A2 is the sensing algorithm that may be used in a wide place and has sufficient responsiveness to capture a moving object.

The environment sensing by the algorithm A2 is performed with the baseline length of the stereo camera 32B set longer than the baseline length with the algorithm A1-2.

The algorithm A3 is a sensing algorithm resistant to a noise such as rain.

The environment sensing by the algorithm A3 is performed such that image processing to remove noise is performed on the distance image imaged by the stereo camera 32B, and then the distance is calculated on the basis of the distance image acquired after the noise removal. Specifically, since image processing of removing raindrops as the noise is added, it is possible to cope with rain although the processing speed decreases and responsiveness decreases.

A known technology is used for the noise removal. The technology for noise removal is disclosed in, for example, "https://digibibo.com/blog-entry-3422.html, and http://www.robot.t.u-tokyo.ac.jp/~yamashita/paper/A/A025Final.pdf".

The algorithm A4 is a sensing algorithm resistant to direct sunlight.

The environment sensing by the algorithm A4 is performed while adjusting imaging parameters so as to increase the shutter speed and decrease the sensitivity of the stereo camera 32B.

The algorithm A5 is a sensing algorithm adaptable to a darkish place.

The environment sensing by the algorithm A5 is performed while adjusting the imaging parameters so as to decrease the shutter speed and increase the sensitivity. Although ranging of the moving object becomes difficult, accuracy is secured by decreasing the moving speed of the conveyance robot 2-5.

Furthermore, the environment sensing by the algorithm A5 may be performed using another sensor. For example, another sensor such as the ToF sensor 32C that does not depend on visible light is used. By using the ToF sensor 32C, it becomes difficult to perform ranging into distance, but it becomes possible to perform ranging even in a dark place. A collision risk may be avoided by decreasing the moving speed of the conveyance robot 2-5 for the fact that the ranging into distance cannot be performed.

The algorithm A6 is a sensing algorithm resistant to a shadow.

The environment sensing by the algorithm A6 is performed while adjusting the imaging parameters so as to extend a dynamic range of luminance of the stereo camera 32B. By extending the dynamic range of luminance, simultaneous ranging of a bright place and a dark place becomes possible.

The algorithm A7 is a sensing algorithm resistant to ranging of a reflector such as a mirror.

The environment sensing by the algorithm A7 is performed using a sensor that does not depend on visible light. For example, a sensor that performs ranging using a sound wave is used.

The algorithm A8 is a sensing algorithm capable of detecting a transparent object.

The environment sensing by the algorithm A8 is performed with imaging resolution of the stereo camera 32B set higher than reference resolution.

The algorithm A9 is a sensing algorithm capable of coping with a completely dark place.

In the environment sensing by the algorithm A9, ranging is performed using an active sensor such as the ToF sensor 32C or the LiDAR 32E.

With reference to FIGS. 21 to 25, an environment sensing condition that is a condition of selection of the sensing algorithm as described above is described.

Figure 21:
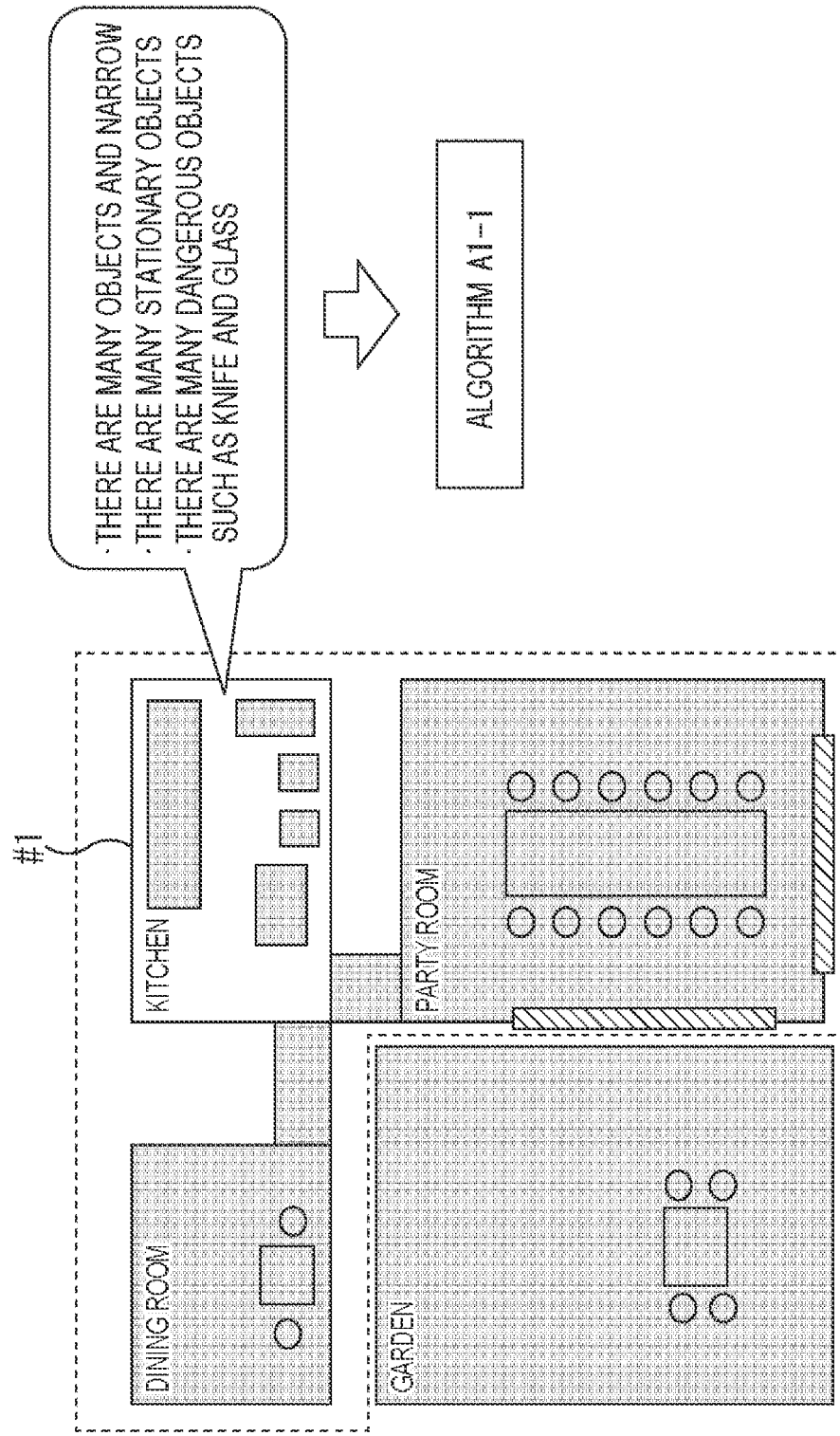
FIG. 21 is a view illustrating an example of an environment sensing condition.

As illustrated in a balloon in FIG. 21, the kitchen #1 is a space having the following features: there are many objects and the space is narrow, there are many stationary objects, and there are many dangerous objects such as knife and glass. Although there are few moving objects, there is a high possibility of colliding with an obstacle because the space is narrow. In order for the conveyance robot 2-5 to move safely, it is required that accuracy be guaranteed even if the responsiveness is poor.

The sensing algorithm suitable for performing the environment sensing in the kitchen #1 having such features is the algorithm A1-1. In a case where the conveyance robot 2-5 is in the kitchen #1, the algorithm A1-1 is used for the environment sensing as indicated by a destination of an open arrow.

In a case where the conveyance robot 2-5 detects a situation that the conveyance robot 2-5 itself is in the kitchen #1, this selects to execute the sensing program that defines the algorithm A1-1 according to the environment sensing condition to perform the environment sensing in the kitchen #1.

The environment sensing condition is a condition of the selection of the sensing algorithm, that is, the selection of the sensing program.

Figure 22:
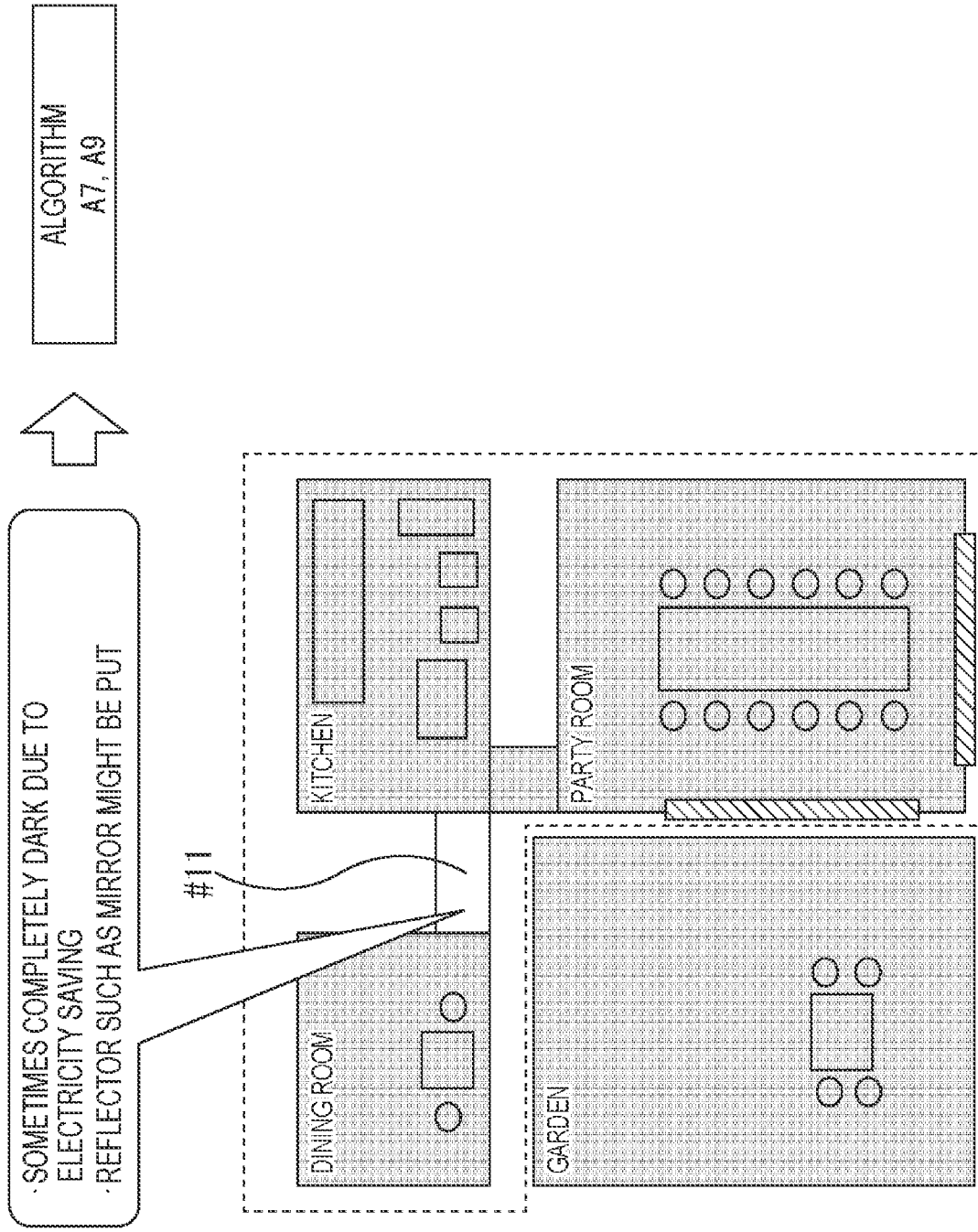
FIG. 22 is a view illustrating another example of the environment sensing condition.

As illustrated in a balloon in FIG. 22, the corridor #11 is a space having the following features: it is sometimes completely dark due to electricity saving, and a reflector such as a mirror is put. Although there is no moving object, there is a high possibility that the conveyance robot 2-5 collides with a wall because this is the completely dark place, or this erroneously recognize itself reflected by the mirror as an obstacle. In order for the conveyance robot 2-5 to move safely, this is required to be resistant to reflection by the reflector such as the mirror and to cope with the completely dark place.

The sensing algorithms suitable for performing the environment sensing in the corridor #11 having such features are the algorithms A7 and A9. In a case where the conveyance robot 2-5 is in the corridor #11, the algorithms A7 and A9 are used for the environment sensing as indicated by a destination of an open arrow.

In a case where the conveyance robot 2-5 detects a situation that the conveyance robot 2-5 itself is in the corridor #11, this selects to execute the sensing programs that define the algorithms A7 and A9 according to the environment sensing condition to perform the environment sensing in the corridor #11.

For example, the environment sensing using the algorithm A7 and the environment sensing using the algorithm A9 are executed in parallel or alternately. In this manner, in a case where a plurality of sensing algorithms is set as the sensing algorithms suitable for the environment sensing condition, the environment sensing is performed by switching the plurality of sensing algorithms.

Figure 23:
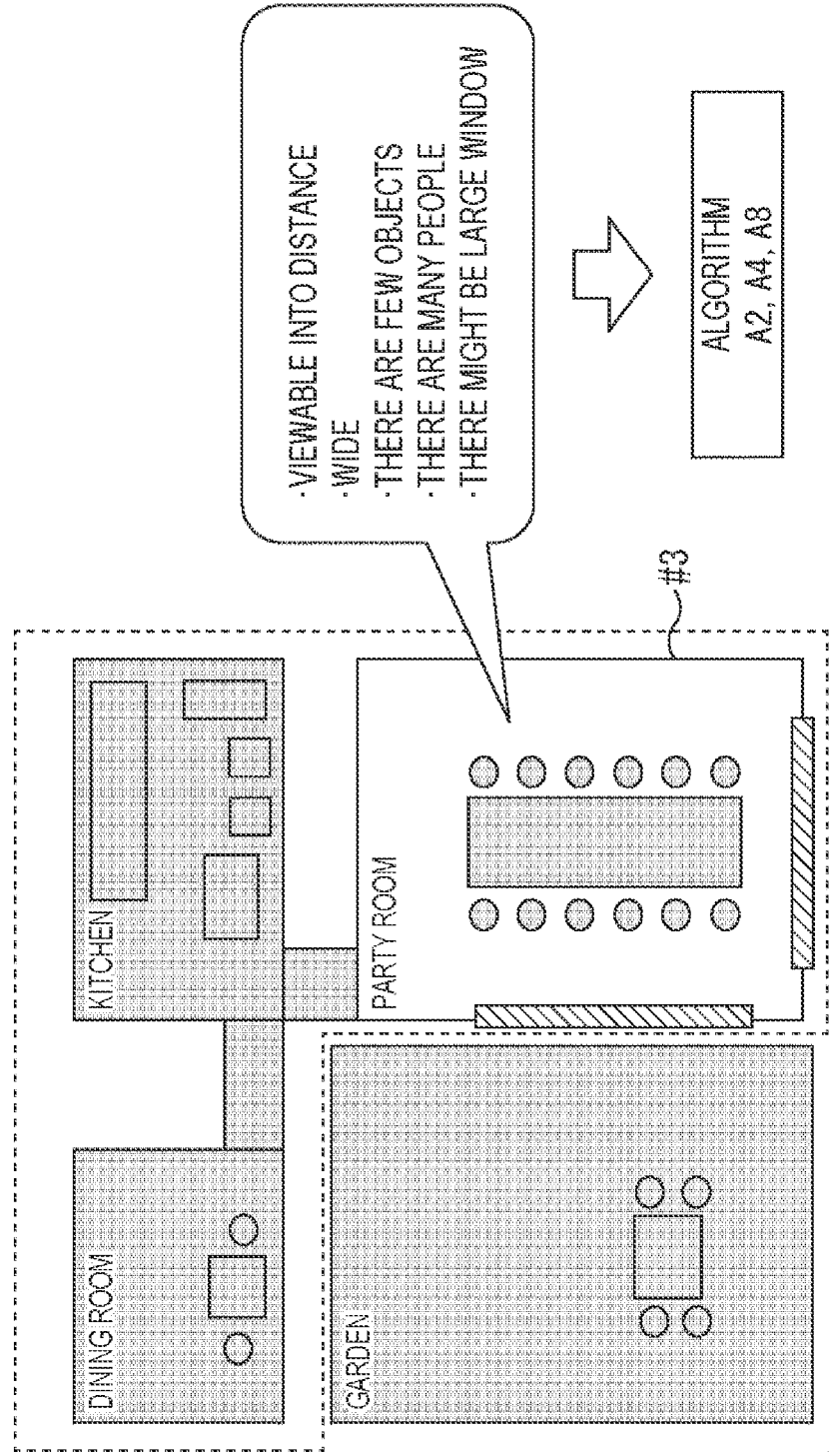
FIG. 23 is a view illustrating still another example of the environment sensing condition.

As illustrated in a balloon in FIG. 23, the party room #3 is a space having the following features: it is viewable into distance, the space is wide, there are few objects, there are many people, and there is a large window. Although this is wide, there is a high possibility of collision with an obstacle because there are many people and many moving objects, or a high possibility of collision because the large window cannot be recognized. Furthermore, direct sunlight entering through the large window is likely to cause erroneous recognition. In order for the conveyance robot 2-5 to move safely, it is required that this may be used in a wide place, resistant to direct sunlight, and may detect a transparent obstacle.

The sensing algorithms suitable for performing the environment sensing in the party room #3 having such features are the algorithms A2, A4, and A8. In a case where the conveyance robot 2-5 is in the party room #3, the algorithms A2, A4, and A8 are used for the environment sensing as indicated by a destination of an open arrow.

In a case where the conveyance robot 2-5 detects a situation that the conveyance robot 2-5 itself is in the party room #3, this selects to execute the sensing programs that define the algorithms A2, A4, and A8 according to the environment sensing condition to perform the environment sensing in the party room #3.

Figure 24:
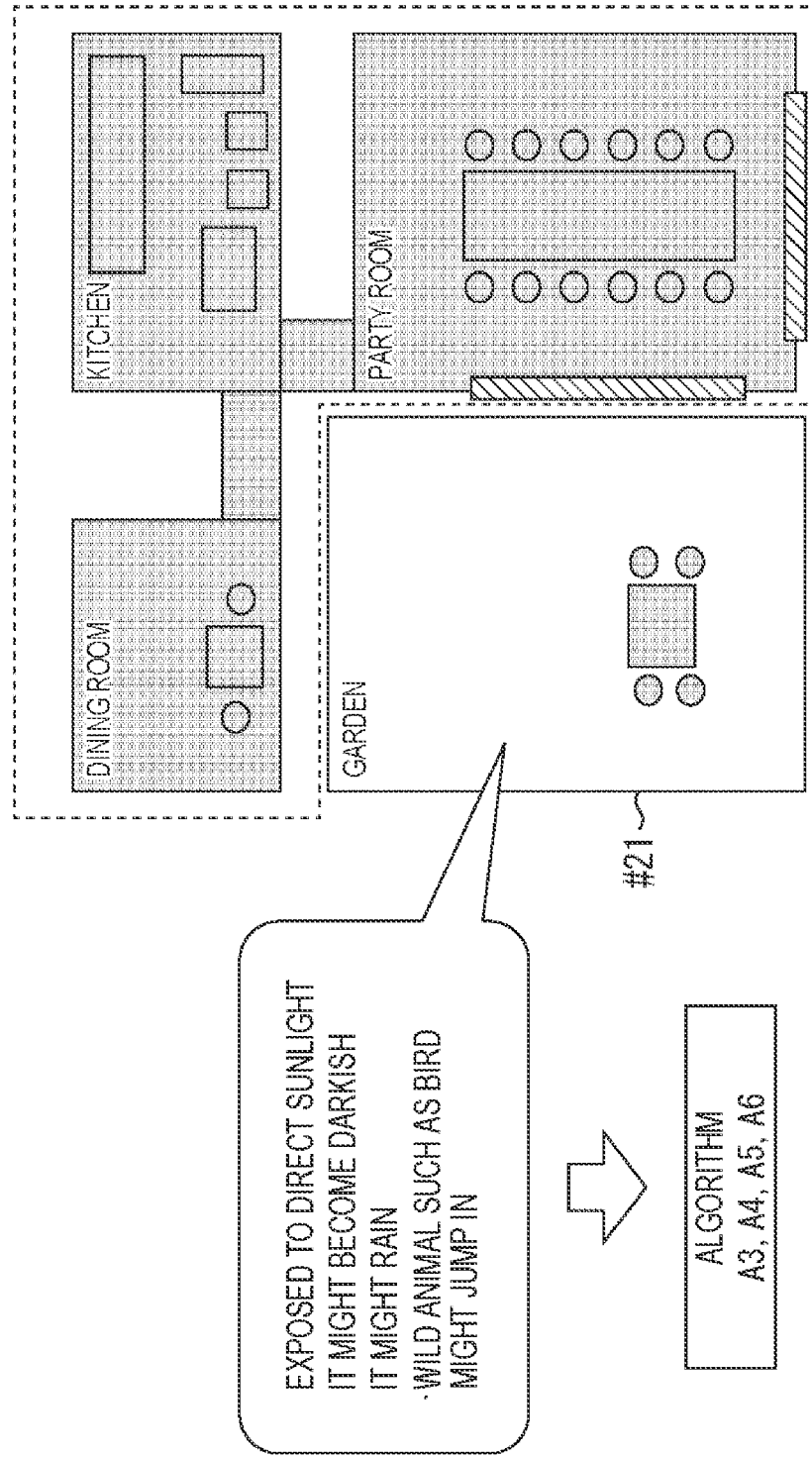
FIG. 24 is a view illustrating still another example of the environment sensing condition.

As illustrated in a balloon in FIG. 24, the garden #21 is a space having the following features: this is exposed to direct sunlight, it might be darkish, it might rain, and a wild animal such as a bird might jump in. There is a high possibility of erroneous recognition due to direct sunlight, rain, or darkishness. Furthermore, there is a high possibility of colliding with a wild animal that suddenly jumps in. In order for the conveyance robot 2-5 to move safely, this is required to be resistant to rain, direct sunlight, and shadow and to cope with the darkish place.

The sensing algorithms suitable for performing the environment sensing in the garden #21 having such features are the algorithms A3, A4, A5, and A6. In a case where the conveyance robot 2-5 is in the garden #21, the algorithms A3, A4, A5, and A6 are used for the environment sensing as indicated by a destination of an open arrow.

In a case where the conveyance robot 2-5 detects a situation that the conveyance robot 2-5 itself is in the garden #21, this selects to execute the sensing programs that define the algorithms A3, A4, A5, and A6 according to the environment sensing condition to perform the environment sensing in the garden #21.

FIG. 25 is a view illustrating an example of correspondence between a serving situation and the sensing algorithm.

For example, the sensing algorithms that may be used in a case where the conveyance object is carried from the kitchen #1 to another space are the algorithms A1-1, A1-2, A2, A4, A7, A8, and A9. Out of the algorithms A1-1, A1-2, A2, A4, A7, A8, and A9, the sensing algorithm corresponding to the environment sensing condition for performing the environment sensing in each use case is selected.

In a case of moving from the kitchen #1 to the party room #3, transition of the sensing algorithm is transition from the algorithm A1-1 to the algorithm A2.

In a case of moving from the kitchen #1 to the garden #21, transition of the sensing algorithm is transition from the algorithm A1-1 to the algorithm A4.

In a case of moving from the kitchen #1 to the party room #3 through the glass-walled corridor #12, transition of the sensing algorithm is transition from the algorithm A1-1 to the algorithm A8, and further from the algorithm A8 to the algorithm A2.

In a case of moving from the kitchen #1 to the party room #3 through the corridor with the mirror, transition of the sensing algorithm is the transition from the algorithm A1-1 to the algorithm A7, and further from the algorithm A7 to the algorithm A2.

In a case of moving from the kitchen #1 to the dining room #2 through the dark corridor #11 without lighting, transition of the sensing algorithm is the transition from the algorithm A1-1 to the algorithm A9 and further from the algorithm A9 to the algorithm A2.

The sensing algorithms that may be used in a case of serving in the garden #21 are the algorithms A3, A4, A5, and A6. In a situation of serving in the garden #21 similarly, the sensing algorithm corresponding to the environment sensing condition that the environment sensing is performed in each use case is selected.

In this manner, in the sensor device 21, various situations of the conveyance robot 2-5 such as a place and an action are detected, and the sensing algorithm is selected according to the environment sensing condition that the environment sensing is performed in such situation.

<Configuration of Conveyance Robot>

Figure 26:
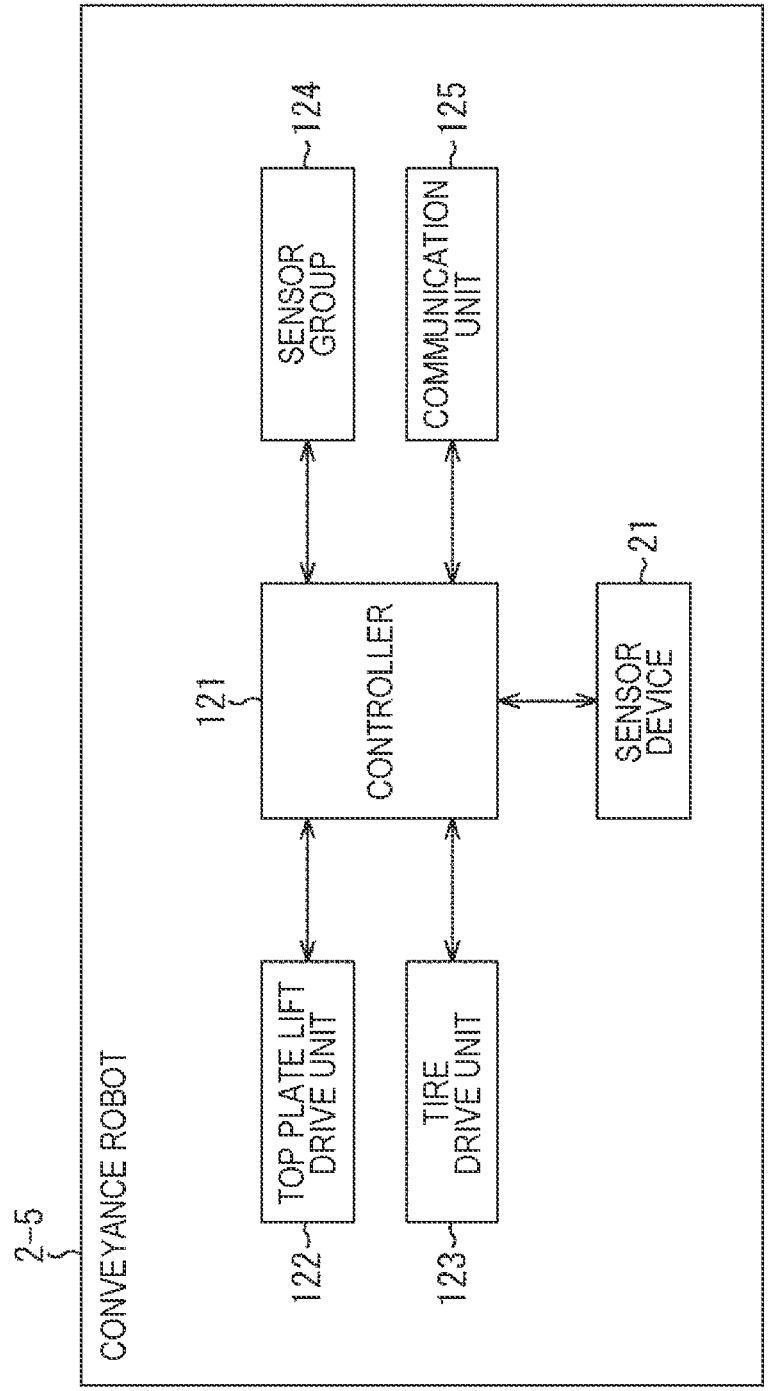
FIG. 26 is a block diagram illustrating a configuration example of hardware of the conveyance robot.

FIG. 26 is a block diagram illustrating a configuration example of hardware of the conveyance robot 2-5.

The conveyance robot 2-5 is formed by connecting a top plate lift drive unit 122, a tire drive unit 123, a sensor group 124, and a communication unit 125 to a controller 121. The sensor device 21 is also connected to the controller 121.

The controller 121 includes a CPU, a ROM, a RAM, a flash memory and the like. The controller 121 executes a predetermined program and controls an entire operation of the conveyance robot 2-5 including the sensor device 21. The controller 121 corresponds to the controller 51 on the host side (FIG. 13).

The top plate lift drive unit 122 includes a motor and the like provided on the connection between the base 101 and the support arm 103, the connection between the top plate 102 and the support arm 103 and the like. The top plate lift drive unit 122 drives the respective connections.

Furthermore, the top plate lift drive unit 122 includes a rail or a motor provided inside the support arm 103. The top plate lift drive unit 122 extends and contracts the support arm 103.

The tire drive unit 123 includes a motor that drives the tires provided on the bottom surface of the base 101.

The sensor group 124 includes various sensors such as a positioning sensor, a gyro sensor, an acceleration sensor, a temperature sensor, and an illuminance sensor. Sensor data indicating a detection result by the sensor group 124 is output to the controller 121.

The communication unit 125 is a wireless communication module such as a wireless LAN module and a mobile communication module compatible with a long term evolution (LTE). The communication unit 125 communicates with an external device such as the program management server 1.

Figure 27:
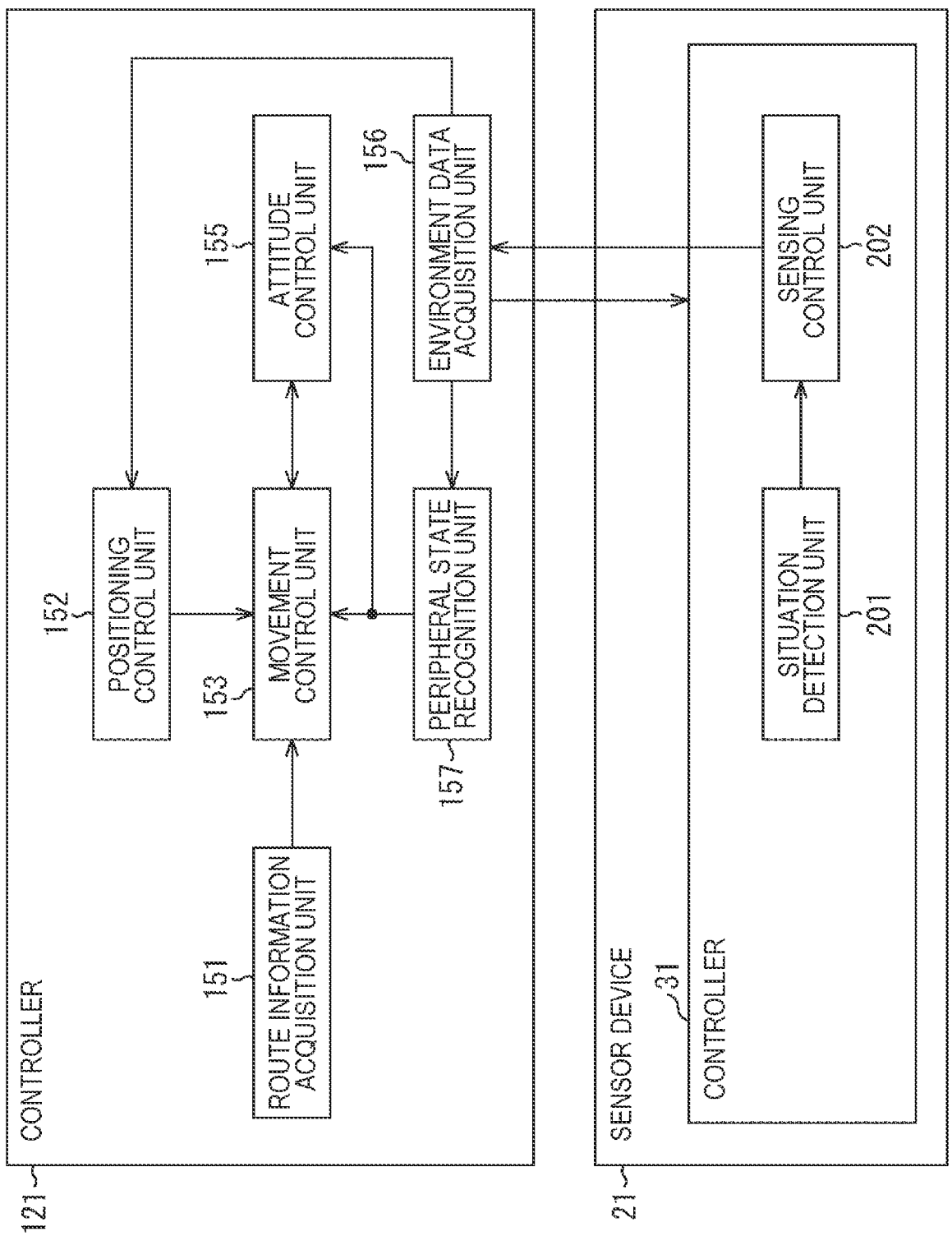
FIG. 27 is a block diagram illustrating a functional configuration example of the conveyance robot.

FIG. 27 is a block diagram illustrating a functional configuration example of the conveyance robot 2-5.

At least a part of functional units illustrated in FIG. 27 is implemented by executing a predetermined program by the CPU forming the controller 121 and the CPU forming the controller 31 of the sensor device 21.

In the controller 121, a route information acquisition unit 151, a positioning control unit 152, a movement control unit 153, an attitude control unit 155, an environment data acquisition unit 156, and a peripheral state recognition unit 157 are implemented.

In contrast, in the controller 31 of the sensor device 21, a situation detection unit 201 and a sensing control unit 202 are implemented. The sensor device 21 is a data processing device that controls the sensing algorithm.

The route information acquisition unit 151 of the controller 121 controls the communication unit 125 and receives information of a destination and a moving route transmitted from a control device not illustrated. The information received by the route information acquisition unit 151 is output to the movement control unit 153.

The route information acquisition unit 151 may plan the moving route on the basis of the destination and a current position of the conveyance robot 2-5 at a timing when the conveyance object is prepared and the like.

In this case, the route information acquisition unit 151 serves as an operation plan setting unit that plans the operation of the conveyance robot 2-5 and sets an operation plan.

The positioning control unit 152 detects the current position of the conveyance robot 2-5. For example, the positioning control unit 152 generates a map of a space in which the conveyance robot 2-5 is installed on the basis of a detection result by a distance sensor forming the sensor device 21. Sensor data, which is an output of the sensor device 21, is acquired by the environment data acquisition unit 156 and supplied to the positioning control unit 152.

The positioning control unit 152 detects the current position by specifying its own position on the generated map. Information on the current position detected by the positioning control unit 152 is output to the movement control unit 153. The detection of the current position by the positioning control unit 152 may be performed on the basis of an output of the positioning sensors forming the sensor group 124.

The movement control unit 153 controls the tire drive unit 123 to control the movement of the conveyance robot 2-5 on the basis of the information supplied from the route information acquisition unit 151 and the current position detected by the positioning control unit 152.

Furthermore, the movement control unit 153 controls the movement so as to avoid an obstacle in a case where information regarding the obstacle around the same is supplied from the peripheral state recognition unit 157. The obstacle includes various moving objects and stationary objects such as people, furniture, and home appliances. In this manner, the movement control unit 153 controls the movement of the conveyance robot 2-5 accompanying the conveyance of the conveyance object on the basis of the result of the environment sensing by the sensor device 21.

The attitude control unit 155 controls the top plate lift drive unit 122 to control the attitude of the conveyance robot 2-5. Furthermore, in conjunction with the control by the movement control unit 153, the attitude control unit 155 controls the attitude of the conveyance robot 2-5 during the movement so as to keep the top plate 102 horizontal.

The attitude control unit 155 controls the attitude of the conveyance robot 2-5 according to the peripheral state recognized by the peripheral state recognition unit 157. For example, the attitude control unit 155 controls the attitude of the conveyance robot 2-5 so that the height of the top plate 102 approaches the height of the top plate of the cooking robot 2-4 or a height of a top plate of a dining table recognized by the peripheral state recognition unit 157.

The environment data acquisition unit 156 controls the sensor device 21 to perform the environment sensing and acquires the sensor data indicating the result of the environment sensing. The sensor data acquired by the environment data acquisition unit 156 is supplied to the positioning control unit 152 and the peripheral state recognition unit 157.

The peripheral state recognition unit 157 recognizes the peripheral state on the basis of the sensor data indicating the result of the environment sensing supplied from the environment data acquisition unit 156. Information indicating a recognition result by the peripheral state recognition unit 157 is supplied to the movement control unit 153 and the attitude control unit 155.

In a case where detection of the obstacle, measurement of a distance to the obstacle, estimation of a direction of the obstacle, estimation of a self-position and the like are performed as the environment sensing by the sensor device 21, the peripheral state recognition unit 157 outputs the information regarding the obstacle as information indicating the recognition result of the peripheral state.

The detection of the obstacle, the measurement of the distance to the obstacle, the estimation of the direction of the obstacle, the estimation of the self-position and the like may be performed by the peripheral state recognition unit 157 on the basis of the result of the environment sensing by the sensor device 21. In this case, the sensor data used for each processing performed by the peripheral state recognition unit 157 is detected by the environment sensing by the sensor device 21.

In this manner, contents of the processing performed by the sensor device 21 as the environment sensing are arbitrary. That is, raw data detected by the sensor provided on the sensor device 21 may be directly supplied to the controller 121 as the sensor data, or processing and analysis of the raw data may be performed on the sensor device 21 side, and a result of the processing and analysis may be supplied to the controller 121 as the sensor data.

The situation detection unit 201 on the sensor device 21 side detects the situation of the conveyance robot 2-5. The situation of the conveyance robot 2-5 is detected on the basis of, for example, the sensor data output from the sensor forming the sensor group 124 or the sensor data output from the sensor provided on the sensor device 21.

The situation of the conveyance robot 2-5 includes, for example, the operation of the conveyance robot 2-5 such as the operation performed by the same, the place where the conveyance robot 2-5 is located, the weather, temperature, humidity, and brightness in the place where the conveyance robot 2-5 is located. Furthermore, the situation of the conveyance robot 2-5 also includes an external situation such as a situation of a person with whom the conveyance robot 2-5 is communicating and a situation of the obstacle around the conveyance robot 2-5.

The situation detection unit 201 outputs information indicating such situation of the conveyance robot 2-5 to the sensing control unit 202.

The sensing control unit 202 selects the sensing algorithm according to the environment sensing condition to perform the environment sensing in the situation detected by the situation detection unit 201, and executes the sensing program that defines the selected sensing algorithm.

For example, the sensing algorithm or the sensing program is associated with each environment sensing condition. The sensing control unit 202 selects the sensing algorithm or the sensing program corresponding to the environment sensing condition using the ID as the identification data. The sensing program set may be selected according to the environment sensing condition.

The sensing control unit 202 drives each sensor provided on the sensor device 21 by executing the sensing program, and outputs the sensor data to the controller 121 on the basis of the output of each sensor.

<Operation of Conveyance Robot>

Here, the operation of the conveyance robot 2-5 having the above-described configuration is described.

Basic Processing

Figure 28:
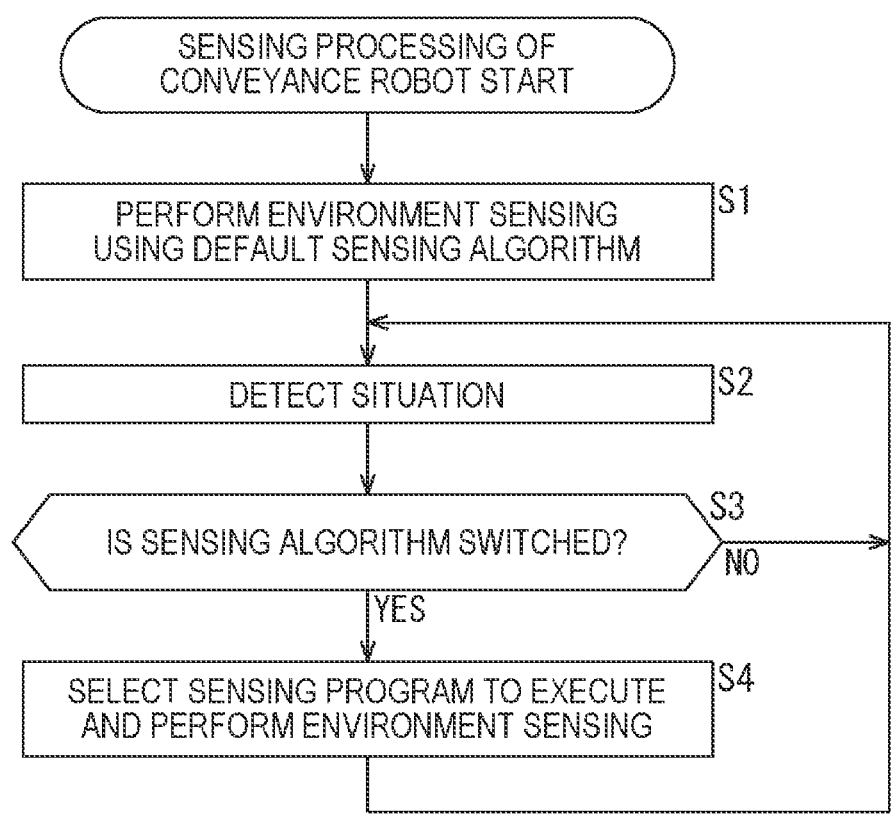
FIG. 28 is a flowchart for explaining basic sensing processing of the conveyance robot.

First, basic sensing processing of the conveyance robot 2-5 is described with reference to a flowchart in FIG. 28.

At step S1, the situation detection unit 201 of the sensor device 21 performs the environment sensing using a default sensing algorithm.

At step S2, the situation detection unit 201 detects the situation of the conveyance robot 2-5 on the basis of the sensor data from the sensor group 124 or the sensor data from the sensor device 21.

At step S3, the sensing control unit 202 determines whether or not to switch the sensing algorithm. For example, in a case where the situation detection unit 201 detects that the situation of the conveyance robot 2-5 changes, it is determined that the sensing algorithm is to be switched.

In a case where it is determined at step S3 that the sensing algorithm is to be switched, at step S4, the sensing control unit 202 selects the sensing algorithm according to the environment sensing condition to perform the environment sensing in the changed situation, and executes the sensing program that defines the selected sensing algorithm.

Thereafter, the procedure returns to step S2 and processing of detecting the situation of the conveyance robot 2-5 is performed, and the above-described processing is repeated. In a case where it is determined at step S3 that the sensing algorithm is not switched, similarly, the procedure returns to step S2 and the above-described processing is repeated.

Specific Processing

Next, serving processing of the conveyance robot 2-5 is described with reference to a flowchart in FIG. 29.

At step S11, the situation detection unit 201 detects a place of the conveyance robot 2-5 on the basis of the sensor data from the sensor group 124 or the sensor data from the sensor device 21.

At step S12, the sensing control unit 202 determines whether or not the conveyance robot 2-5 is located indoors on the basis of a detection result by the situation detection unit 201.

In a case where it is determined at step S12 that the conveyance robot 2-5 is located indoors, at step S13, the sensing control unit 202 performs the environment sensing using an indoor basic algorithm.

The indoor basic algorithm is the sensing algorithm to adjust imaging parameters of the stereo camera 32B such as a shutter speed and sensitivity according to intensity of ambient light and perform the environment sensing. The shutter speed is set to a standard to lower speed, and the sensitivity is set to standard to higher sensitivity.

At step S14, the sensing control unit 202 performs indoor processing. In the indoor processing, the sensing algorithm is selected according to an indoor situation, and the environment sensing is performed. The sensing algorithm used for the environment sensing is appropriately switched from the indoor basic algorithm to another sensing algorithm. The indoor processing is described later in detail with reference to a flowchart in FIG. 30.

In contrast, in a case where it is determined at step S12 that the conveyance robot 2-5 is not located indoors, that is, located outdoors, the sensing control unit 202 performs the environment sensing using an outdoor basic algorithm at step S15.

The outdoor basic algorithm is the sensing algorithm to adjust imaging parameters of the stereo camera 32B such as a shutter speed and sensitivity according to intensity of ambient light and perform the environment sensing. The shutter speed is set to a standard to higher speed, and the sensitivity is set to standard to lower sensitivity.

At step S16, the sensing control unit 202 performs outdoor processing. In the outdoor processing, the sensing algorithm is selected according to an outdoor situation, and the environment sensing is performed. The sensing algorithm used for the environment sensing is appropriately switched from the outdoor basic algorithm to another sensing algorithm. The outdoor processing is described later in detail with reference to a flowchart in FIG. 31.

After the indoor processing is performed at step S14 or after the outdoor processing is performed at step S16, the procedure returns to step S11, and the subsequent processing is repeated.

Figure 29:
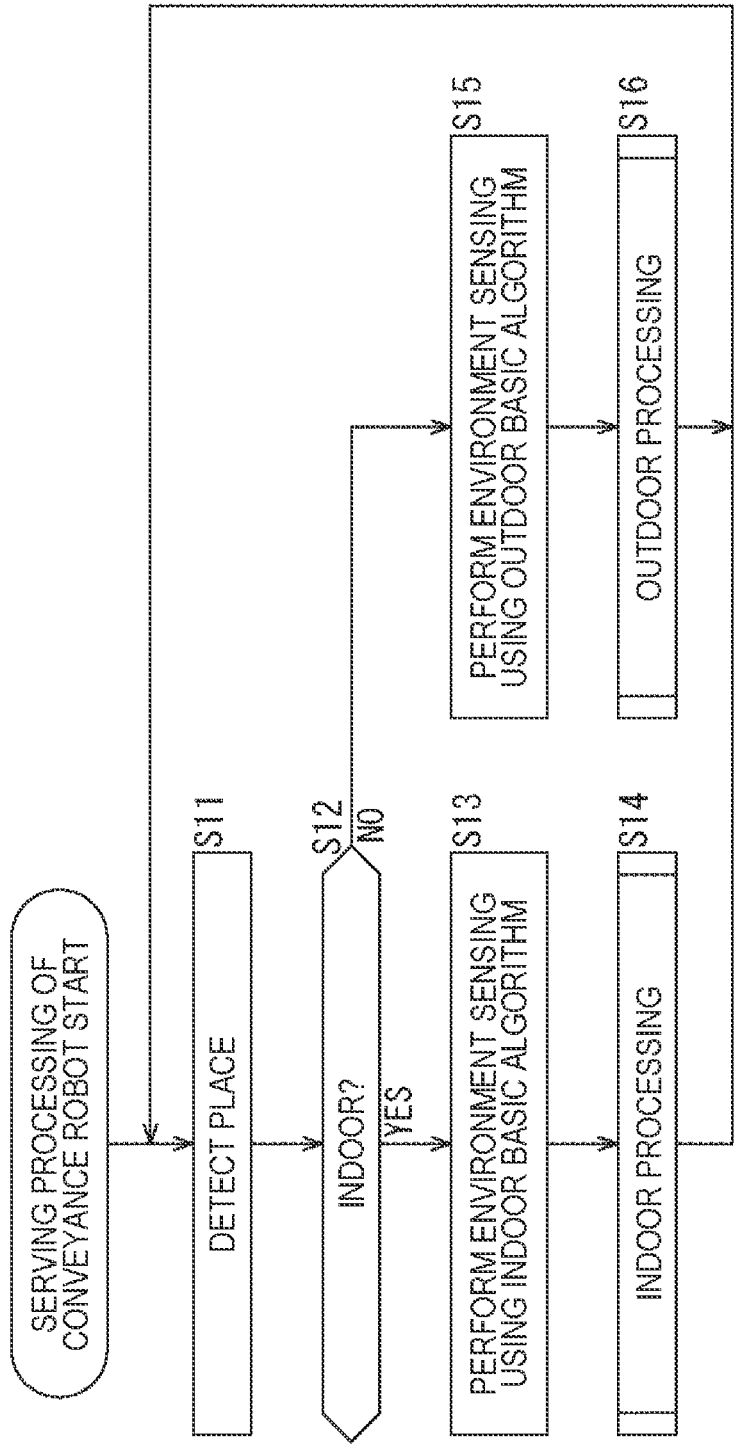
FIG. 29 is a flowchart for explaining serving processing of the conveyance robot.
Figure 30:
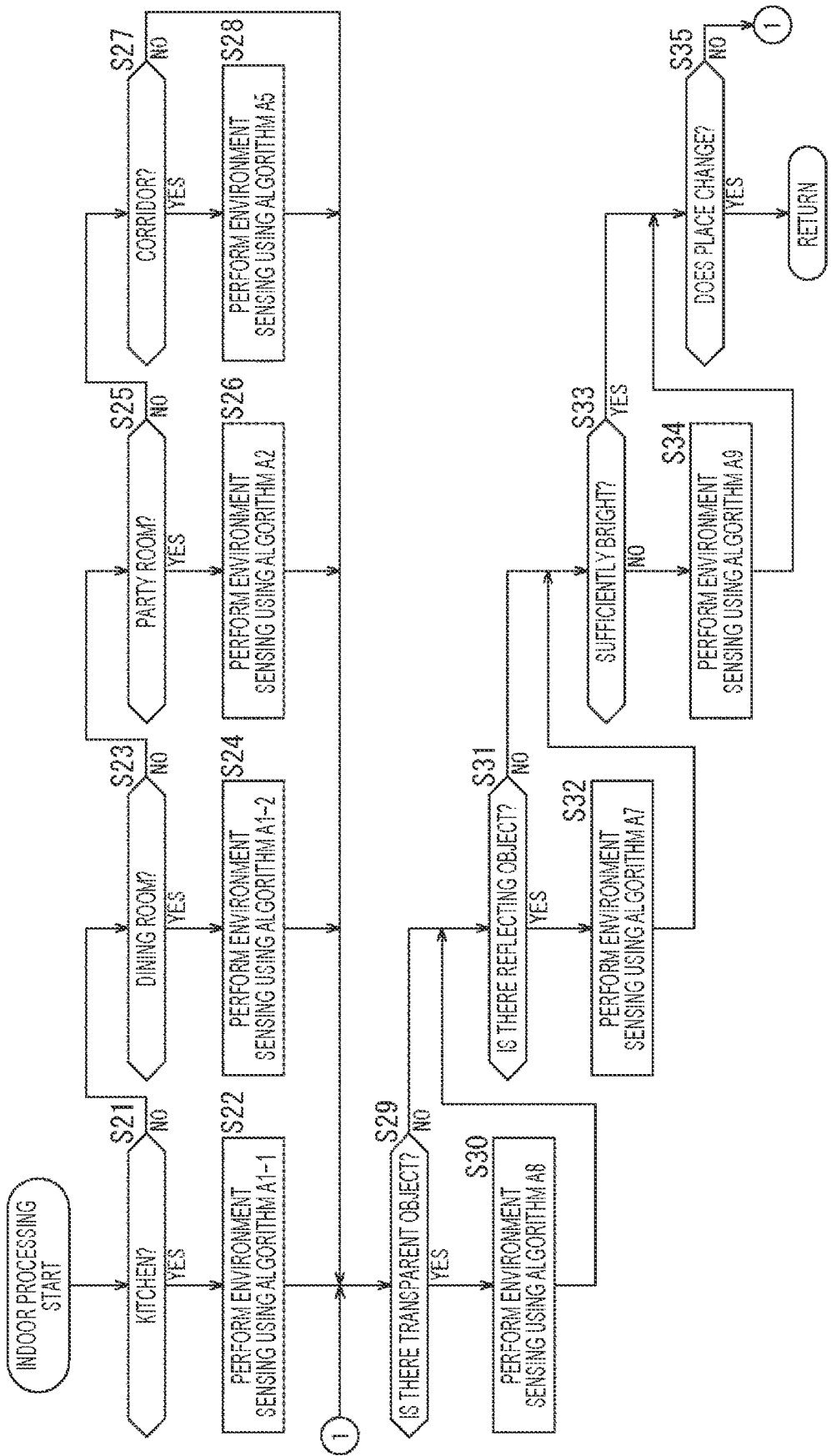
FIG. 30 is a flowchart for explaining indoor processing performed at step S14 in FIG. 29.

Here, the indoor processing performed at step S14 in FIG. 29 is described with reference to the flowchart in FIG. 30.

At step S21, the sensing control unit 202 determines whether or not the conveyance robot 2-5 is located in the kitchen #1.

In a case where it is determined at step S21 that the conveyance robot 2-5 is located in the kitchen #1, at step S22, the sensing control unit 202 selects the algorithm A1-1 according to the environment sensing condition that the environment sensing is performed in the kitchen #1 and performs the environment sensing.

In a case where it is determined at step S21 that the conveyance robot 2-5 is not located in the kitchen #1, at step S23, the sensing control unit 202 determines whether or not the conveyance robot 2-5 is located in the dining room #2.

In a case where it is determined at step S23 that the conveyance robot 2-5 is located in the dining room #2, at step S24, the sensing control unit 202 selects the algorithm A1-2 according to the environment sensing condition that the environment sensing is performed in the dining room #2 and performs the environment sensing.

In a case where it is determined at step S23 that the conveyance robot 2-5 is not located in the dining room #2, at step S25, the sensing control unit 202 determines whether or not the conveyance robot 2-5 is located in the party room #3.

In a case where it is determined at step S25 that the conveyance robot 2-5 is located in the party room #3, at step S26, the sensing control unit 202 selects the algorithm A2 according to the environment sensing condition that the environment sensing is performed in the party room #3 and performs the environment sensing.

In a case where it is determined at step S25 that the conveyance robot 2-5 is not located in the party room #3, at step S27, the sensing control unit 202 determines whether or not the conveyance robot 2-5 is located in the corridor #11.

In a case where it is determined at step S27 that the conveyance robot 2-5 is located in the corridor #11, at step S28, the sensing control unit 202 selects the algorithm A5 according to the environment sensing condition that the environment sensing is performed in the corridor #11 and performs the environment sensing.

After the environment sensing is performed using any one of the algorithms A1-1, A1-2, and A2 or the algorithm A5 according to the place of the conveyance robot 2-5, or in a case where it is determined at step S27 that the conveyance robot 2-5 is not located in the corridor #11, the procedure shifts to step S29.

At step S29, the sensing control unit 202 determines whether or not there is a transparent object near the conveyance robot 2-5. It is determined whether or not there is the transparent object on the basis of the detection result of the situation by the situation detection unit 201.

In a case where it is determined at step S29 that there is a transparent object near the conveyance robot 2-5, at step S30, the sensing control unit 202 selects the algorithm A8 according to the environment sensing condition that the environment sensing is performed in a place where there is the transparent obstacle and performs the environment sensing.

After the environment sensing is performed at step S30, or in a case where it is determined at step S29 that there is no transparent object near the conveyance robot 2-5, the procedure shifts to step S31.

At step S31, the sensing control unit 202 determines whether or not there is a reflecting object near the conveyance robot 2-5. It is determined whether or not there is the reflecting object on the basis of the detection result of the situation by the situation detection unit 201.

In a case where it is determined at step S31 that there is the reflecting object near the conveyance robot 2-5, at step S32, the sensing control unit 202 selects the algorithm A7 according to the environment sensing condition that the environment sensing is performed in a place where there is the reflector and performs the environment sensing.

After the environment sensing is performed at step S32, or in a case where it is determined at step S31 that there is no reflecting object near the conveyance robot 2-5, the procedure shifts to step S33.

At step S33, the sensing control unit 202 determines whether or not brightness in the place of the conveyance robot 2-5 is sufficient. It is determined whether or not the brightness is sufficient on the basis of the detection result of the situation by the situation detection unit 201.

In a case where it is determined at step S33 that the brightness in the place of the conveyance robot 2-5 is not sufficient, at step S34, the sensing control unit 202 selects the algorithm A9 according to the environment sensing condition that the environment sensing is performed in the completely dark place and performs the environment sensing.

After the environment sensing is performed at step S34, or in a case where it is determined at step S33 that the brightness in the place of the conveyance robot 2-5 is sufficient, the procedure shifts to step S35.

At step S35, the sensing control unit 202 determines whether or not the place of the conveyance robot 2-5 changes. It is determined whether or not the place of the conveyance robot 2-5 changes on the basis of the detection result of the situation by the situation detection unit 201.

In a case where it is determined at step S35 that the place of the conveyance robot 2-5 does not change, the procedure returns to step S29, and the above-described processing is repeated.

In contrast, in a case where it is determined at step S35 that the place of the conveyance robot 2-5 changes, the procedure returns to step S14 in FIG. 29, and the subsequent processing is performed.

Figure 31:
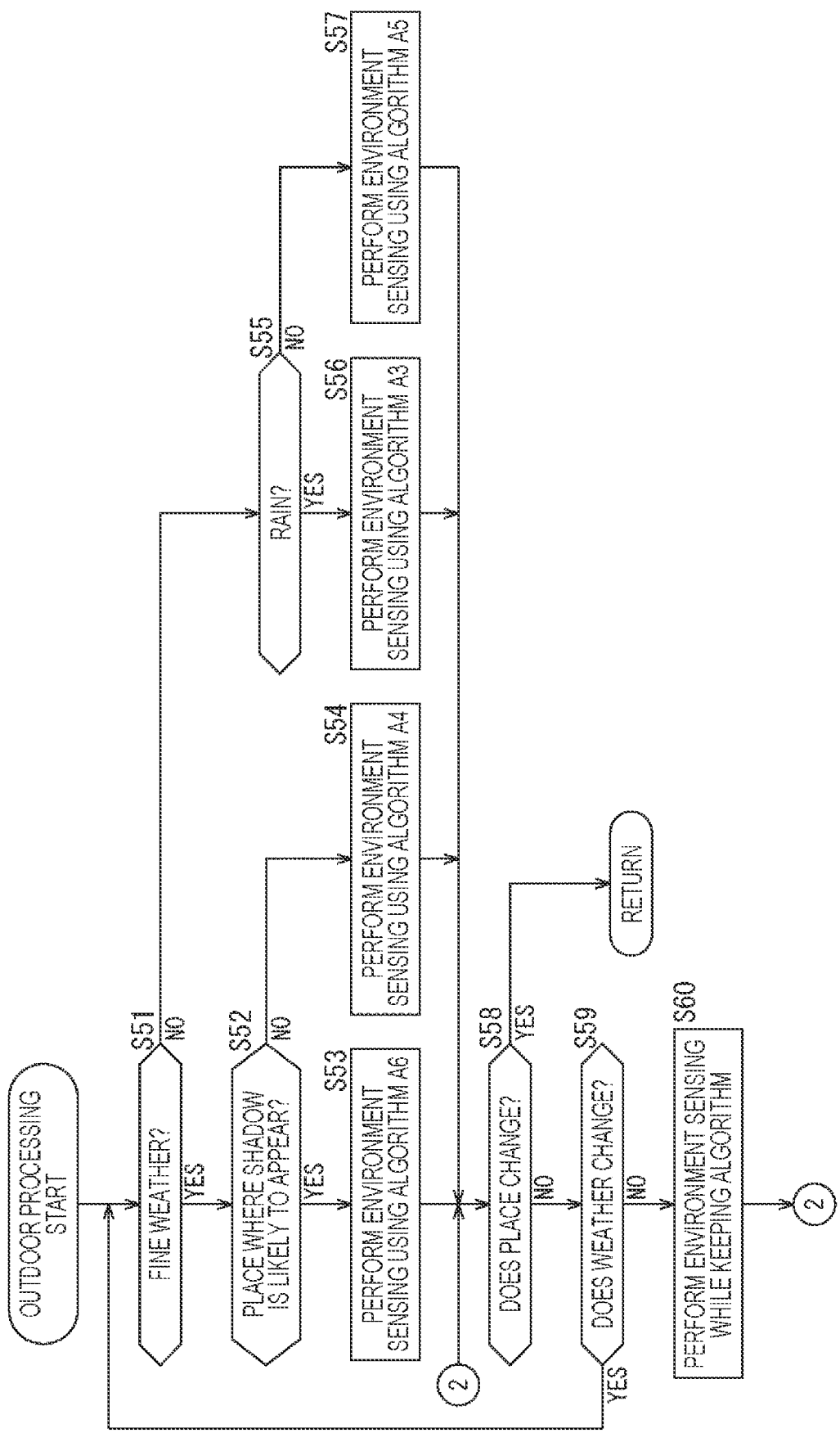
FIG. 31 is a flowchart for explaining outdoor processing performed at step S16 in FIG. 29.

Next, the outdoor processing performed at step S16 in FIG. 29 is described with reference to the flowchart in FIG. 31.

At step S51, the sensing control unit 202 determines whether or not the weather in the place of the conveyance robot 2-5 is fine. It is determined whether or not the weather is fine on the basis of the detection result of the situation by the situation detection unit 201.

In a case where it is determined at step S51 that the weather in the place of the conveyance robot 2-5 is fine, at step S52, the sensing control unit 202 determines whether or not this is a place where a shadow is likely to appear.

In a case where it is determined at step S52 that the place is the place where the shadow is likely to appear, at step S53, the sensing control unit 202 selects the algorithm A6 according to the environment sensing condition to perform the environment sensing in the place where the shadow is likely to appear and performs the environment sensing.

In a case where it is determined at step S52 that the place is not the place where the shadow is likely to occur, at step S54, the sensing control unit 202 selects the algorithm A4 according to the environment sensing condition to perform the environment sensing under direct sunlight and performs the environment sensing.

In contrast, in a case where it is determined at step S51 that the weather is not fine, the procedure shifts to step S55.

At step S55, the sensing control unit 202 determines whether or not it is raining. It is determined whether or not it is raining on the basis of the detection result of the situation by the situation detection unit 201.

In a case where it is determined at step S55 that it is raining, at step S56, the sensing control unit 202 selects the algorithm A3 according to the environment sensing condition that the environment sensing is performed in a place where it is raining and performs the environment sensing.

In a case where it is determined at step S55 that it is not raining, at step S57, the sensing control unit 202 selects the algorithm A5 according to the environment sensing condition that the environment sensing is performed in a darkish place and performs the environment sensing.

After the environment sensing is performed using any one of the algorithms A3 to A6, at step S58, the sensing control unit 202 determines whether or not the place of the conveyance robot 2-5 changes.

In a case where it is determined at step S58 that the place of the conveyance robot 2-5 does not change, at step S59, the sensing control unit 202 determines whether or not the weather changes.

In a case where it is determined at step S59 that the weather changes, the procedure returns to step S51, and the above-described processing is repeated.

In a case where it is determined at step S59 that the weather does not change, at step S60, the sensing control unit 202 keeps the selected sensing algorithm and performs the environment sensing. Thereafter, the procedure returns to step S58, and the above-described processing is repeated.

In a case where it is determined at step S58 that the place changes, the procedure returns to step S16 in FIG. 29, and the subsequent processing is repeated. By the above-described processing, the conveyance robot 2-5 may adaptively select the sensing algorithm according to the situation and perform the highly accurate environment sensing.

In a case of a timing to perform the environment sensing using a certain sensing algorithm, when the sensing program that defines the sensing algorithm is not prepared, it is possible to access the program management server 1 to acquire the sensing program from the program management server 1.

Although the processing performed in the sensor device 21 mounted on the conveyance robot 2-5 is described, the above-described processing of performing the environment sensing while switching the sensing algorithm is performed in each device on which the sensor device 21 is mounted such as the mobile terminal 2-1.

<Variation>

Example of Case where Sensing Algorithm is Externally Selected

The selection of the sensing algorithm corresponding to the environment sensing condition is performed in the sensor device 21, but this may be performed by a device outside the device on which the sensor device 21 is mounted.

Figure 32:
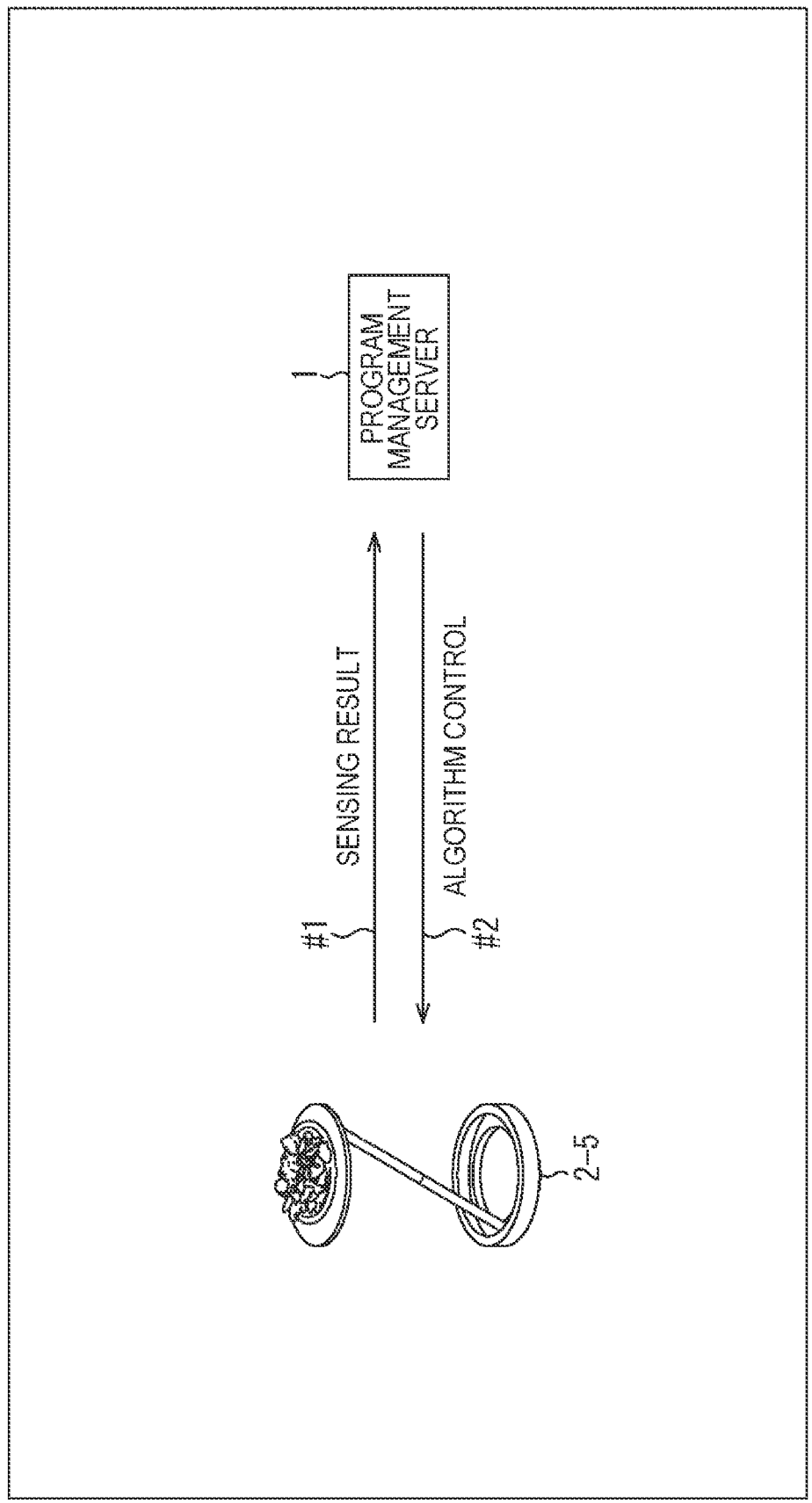
FIG. 32 is a view illustrating an example of control of a sensing algorithm.

FIG. 32 is a view illustrating an example of control of the sensing algorithm.

In the example in FIG. 32, the selection of the sensing algorithm corresponding to the environment sensing condition is performed by the program management server 1, which is the external device. In this case, the configuration of the controller 31 in FIG. 27 is implemented in the program management server 1. The program management server 1 is a data processing device that controls the sensing program executed by the sensor device 21 mounted on the conveyance robot 2-5.

As indicated by an arrow #1, from the conveyance robot 2-5 to the program management server 1, sensor data used for detecting a situation is transmitted and the sensing program is requested.

The situation detection unit 201 of the program management server 1 detects the situation of the conveyance robot 2-5 on the basis of the sensor data transmitted from the conveyance robot 2-5. Furthermore, the environment sensing condition corresponding to the situation of the conveyance robot 2-5 is determined by the sensing control unit 202, and the sensing algorithm is selected.

The sensing control unit 202 of the program management server 1 transmits the sensing program that defines the sensing algorithm corresponding to the environment sensing condition to the sensor device 21 mounted on the conveyance robot 2-5, and causes the same to execute the sensing program as indicated by an arrow #2. In this case, the sensing control unit 202 of the program management server 1 serves as a data processing unit that transmits the sensing program that defines the sensing algorithm corresponding to the environment sensing condition to the conveyance robot 2-5.

In this manner, the sensing algorithm may be controlled by a device outside the sensor device 21. For example, the controller 121 of the conveyance robot 2-5 on which the sensor device 21 is mounted may be made an external device, and the sensing algorithm may be controlled by the controller 121.

The sensing program that defines the sensing algorithm corresponding to the environment sensing condition may be executed by the program management server 1 or the controller 121, which is the external device, and information indicating an execution result may be transmitted to the sensor device 21.

Figure 33:
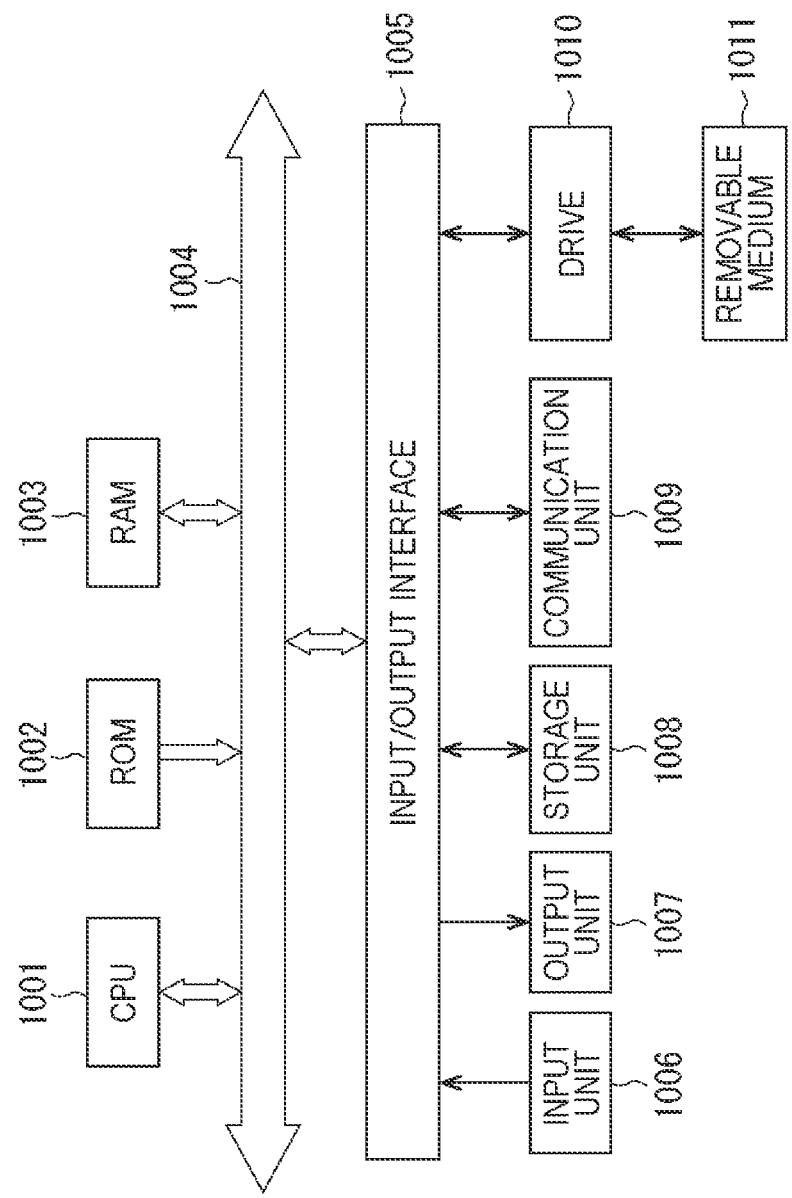
FIG. 33 is a block diagram illustrating a configuration example of hardware of a computer that implements a program management server.

FIG. 33 is a block diagram illustrating a configuration example of hardware of a computer that implements the program management server 1.

A central processing unit (CPU) 1001, a read only memory (ROM) 1002, and a random access memory (RAM) 1003 are connected to one another by a bus 1004.

An input/output interface 1005 is further connected to the bus 1004. An input unit 1006 including a keyboard, a mouse and the like, and an output unit 1007 including a display, a speaker and the like are connected to the input/output interface 1005. Furthermore, a storage unit 1008 including a hard disk, a nonvolatile memory and the like, a communication unit 1009 including a network interface and the like, and a drive 1010 that drives a removable medium 1011 are connected to the input/output interface 1005.

The control of the sensing algorithm as described above is implemented by execution of a predetermined program by the CPU 1001.

Example of Program

The above-described series of processing may be executed by hardware or may be executed by software. In a case where the series of processing is executed by software, a program forming the software is installed on a computer incorporated in dedicated hardware, a general-purpose personal computer or the like.

The program to be installed is recorded in the removable medium 1011 illustrated in FIG. 33 including an optical disk (compact disc-read only memory (CD-ROM), digital versatile disc (DVD) and the like), a semiconductor memory and the like to be provided. Furthermore, this may be provided via a wired or wireless transmission medium such as a local area network, the Internet, and digital broadcasting. The program may be installed in advance on the ROM 1002 and the storage unit 1008.

Note that, the program executed by the computer may be the program of which processing is performed in chronological order in the order described in this specification or may be the program of which processing is performed in parallel or at required timing such as when a call is issued.

Note that, in this specification, the system is intended to mean assembly of a plurality of components (devices, modules (parts) and the like) and it does not matter whether or not all the components are in the same casing. Therefore, a plurality of devices accommodated in different casings and connected via a network and one device in which a plurality of modules is accommodated in one casing are the systems.

The effects described in this specification are illustrative only; the effects are not limited thereto and there may also be another effect.

The embodiments of the present technology are not limited to the above-described embodiments and various modifications may be made without departing from the gist of the present technology.

For example, the present technology may be configured as cloud computing in which one function is shared by a plurality of devices via the network to process together.

Furthermore, each step described in the above-described flowchart may be executed by one device or executed by a plurality of devices in a shared manner.

Moreover, in a case where a plurality of processes is included in one step, the plurality of processes included in one step may be executed by one device or by a plurality of devices in a shared manner.

REFERENCE SIGNS LIST

1 Program management server
2-1 Mobile terminal
2-2 Arm robot
2-3 Moving body
2-4 Cooking robot
2-5 Conveyance robot
21 Sensor device
31 Controller
32 Sensor group
121 Controller
124 Sensor group
201 Situation detection unit
202 Sensing control unit

The invention claimed is:

1. A data processing device comprising:
a situation detection unit configured to detect a situation of a robot based on sensor data output with a first parameter setting from a sensor mounted on the robot; and
a sensing control unit configured to select and execute an environment sensing program in which an environment sensing algorithm is used to sense an environment based on sensor data output with a second parameter setting from the sensor mounted on the robot with predetermined sensitivity is defined from an environment sensing program set including a combination of a plurality of environment sensing programs according to the situation of the robot,
wherein the situation detection unit and the sensing control unit are each implemented via at least one processor.

2. The data processing device according to claim 1, wherein the sensing control unit selects the environment sensing program acquired via a network.

3. The data processing device according to claim 1, wherein the environment sensing program set includes a combination of information indicating a type of the environment sensing algorithm defined in the environment sensing program and information indicating order of execution of the environment sensing programs.

4. The data processing device according to claim 1, wherein the sensing control unit selects the environment sensing program set using identification data to identify the environment sensing program set.

5. The data processing device according to claim 1, wherein environment sensing algorithms defined in the plurality of environment sensing programs are algorithms applied to sensor data output while setting different parameters to the same sensor.

6. The data processing device according to claim 1, wherein environment sensing algorithms defined in the plurality of environment sensing programs are algorithms applied to sensor data output while setting a same parameter to the same sensor.

7. The data processing device according to claim 1, wherein environment sensing algorithms defined in the plurality of environment sensing programs are algorithms applied to sensor data output from a plurality of different sensors.

8. The data processing device according to claim 7, wherein
at least any one of the environment sensing program and the environment sensing algorithm defined in the environment sensing program is associated with the sensor, and
the sensing control unit controls operations of a plurality of sensors in conjunction with selection and execution of the environment sensing program.

9. The data processing device according to claim 1, further comprising:
a movement control unit configured to control a state of movement by a moving unit accompanying conveyance of a conveyance object based on an execution result of the environment sensing program by the sensing control unit,
wherein the movement control unit is implemented via at least one processor.

10. The data processing device according to claim 9, further comprising:
a top plate on which the conveyance object is placed;
an extendable support unit that supports the top plate; and
the moving unit connected to the support unit, wherein
the movement control unit controls an attitude state including a state of the top plate and a state of the support unit and a state of movement by the moving unit based on the execution result of the environment sensing program by the sensing control unit.

11. The data processing device according to claim 10, wherein
on the top plate, the conveyance object placed by a cooking arm of a cooking system driven according to a cooking process or a human is placed.

12. A data processing method comprising:
by a data processing device,
detecting a situation of a robot based on sensor data output with a first parameter setting from a sensor mounted on the robot; and
selecting and executing an environment sensing program in which an environment sensing algorithm is used to sense an environment based on sensor data output with a second parameter setting from the sensor mounted on the robot with predetermined sensitivity is defined from an environment sensing program set including a combination of a plurality of environment sensing programs according to the situation of the robot.

13. A data processing device comprising:
a situation detection unit configured to detect a situation of a robot based on sensor data output with a first parameter setting from a sensor mounted on the robot; and
a data processing unit configured to
select an environment sensing program in which an environment sensing algorithm is used to sense an environment based on sensor data output with a second parameter setting from the sensor mounted on the robot with predetermined sensitivity is defined from an environment sensing program set including a combination of a plurality of environment sensing programs according to the situation of the robot, and
transmit the selected environment sensing program to the robot.

14. The data processing device according to claim 1, wherein the situation of the robot includes at least one of an operation performed by the robot, a place where the robot is located, weather, temperature, humidity, or brightness in the place where the robot is located.

15. The data processing device according to claim 14, wherein the situation of the robot further includes information indicating whether the robot is located outdoor environment or indoor environment.

16. The data processing device according to claim 1, wherein the situation of the robot includes at least one of a situation of a person with whom the robot is communicating or a situation of an obstacle around the robot.

17. The data processing device according to claim 16, wherein the situation of the obstacle around the robot includes information of a reflectance property of the obstacle.

18. The data processing device according to claim 10, wherein the movement control unit controls a height of the top plate to be substantially the same as a height of a part of another robot.

19. The data processing device according to claim 10, wherein the movement control unit controls a height of the top plate to be substantially the same as a height of a part of an object recognized by the situation detection unit.

* * * * *